US012775797B2

(12) United States Patent
Kempf et al.

(10) Patent No.: US 12,775,797 B2
(45) Date of Patent: Oct. 27, 2026

(54) TECHNIQUES FOR USING GENERATIVE ARTIFICIAL INTELLIGENCE TO FORMULATE SEARCH ANSWERS

(71) Applicant: Salesforce, Inc., San Francisco, CA (US)

(72) Inventors: Guillaume Jean Mathieu Kempf, San Francisco, CA (US); Georgios Balikas, Grenoble (FR); Ghislain Brun, Grenoble (FR); Darya Brazouskaya, Grenoble (FR); Qianqian Shi, San Francisco, CA (US); Marjan Hosseinia, Houston, TX (US); Matthieu Landos, Grenoble (FR); Médéric Carriat, Paris (FR); Mukund Ramachandran, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 73 days.

(21) Appl. No.: 18/416,318

(22) Filed: Jan. 18, 2024

(65) Prior Publication Data

US 2025/0086391 A1    Mar. 13, 2025

Related U.S. Application Data

(60) Provisional application No. 63/581,911, filed on Sep. 11, 2023.

(51) Int. Cl.
*G06F 40/284* (2020.01)
*G06F 16/31* (2019.01)
(Continued)

(52) U.S. Cl.
CPC ............ *G06F 40/284* (2020.01); *G06F 16/31* (2019.01); *G06F 16/3347* (2019.01); *G06F 40/40* (2020.01)

(58) Field of Classification Search
CPC .... G06F 40/284; G06F 16/31; G06F 16/3347; G06F 40/40; G06F 40/30
See application file for complete search history.

(56) References Cited

U.S. PATENT DOCUMENTS 8,316,237 B1 * 11/2012 Felsher ................ H04L 63/061 380/282
10,523,643 B1 * 12/2019 Davis ...................... H04L 63/20
(Continued)

OTHER PUBLICATIONS

Bhagdev, R., Chapman, S., Ciravegna, F., Lanfranchi, V., & Petrelli, D. (Jun. 2008). Hybrid search: Effectively combining keywords and semantic searches. In European semantic web conference (pp. 554-568). Berlin, Heidelberg: Springer Berlin Heidelberg. (Year: 2008).*

(Continued)

*Primary Examiner* — Philip H Lam
(74) *Attorney, Agent, or Firm* — Holland & Hart, LLP.

(57) ABSTRACT

A method of data processing is described. The method includes converting a plain-text query into a vector-based object by using a text embedding function to process one or more tokens in the plain-text query. The method further includes retrieving a set of passages from a first datastore of the data processing system based on using one or more search indexes stored in a second datastore of the data processing system to compare the vector-based object and the one or more tokens in the plain-text query to vector-based objects and token-based objects associated with the set of passages. The method further includes generating a prompt that includes tokens from the plain-text query, tokens from one or more of the set of passages retrieved from the first datastore, and instructions for creating a response to the plain-text query. The method further includes transmitting the prompt to a large language model (LLM).

18 Claims, 13 Drawing Sheets

(51) Int. Cl.
*G06F 16/334* (2025.01)
*G06F 40/40* (2020.01)

(56) References Cited

U.S. PATENT DOCUMENTS

| | | | | |
|---|---|---|---|---|
| 10,747,894 | B1 * | 8/2020 | Cline | G06F 40/35 |
| 2016/0335263 | A1 * | 11/2016 | Yin | G06F 16/24578 |
| 2019/0347256 | A1 * | 11/2019 | Wu | G06F 16/2462 |
| 2020/0242161 | A1 * | 7/2020 | Dugan | G06N 20/00 |
| 2022/0198028 | A1 * | 6/2022 | Holmes | G06F 16/903 |
| 2022/0414137 | A1 * | 12/2022 | Sewak | G06F 16/3346 |
| 2023/0300152 | A1 * | 9/2023 | Brancato | H04L 41/064 726/23 |
| 2023/0359441 | A1 * | 11/2023 | Duan | G06N 3/084 |
| 2024/0354130 | A1 * | 10/2024 | Cadoni | G06F 40/279 |
| 2024/0370339 | A1 * | 11/2024 | Statton | G06F 11/1458 |
| 2024/0386058 | A1 * | 11/2024 | Thomas | G06F 40/103 |
| 2024/0403373 | A1 * | 12/2024 | Chao | G06F 16/9538 |
| 2024/0419710 | A1 * | 12/2024 | Matson | G06F 16/338 |
| 2025/0005051 | A1 * | 1/2025 | Khosla | G06F 16/3329 |
| 2025/0284886 | A1 * | 9/2025 | Wadhawan | G06F 40/253 |

OTHER PUBLICATIONS

Sachan, D., Lewis, M., Joshi, M., Aghajanyan, A., Yih, W. T., Pineau, J., & Zettlemoyer, L. (Dec. 2022). Improving passage retrieval with zero-shot question generation. In Proceedings of the 2022 Conference on Empirical Methods in Natural Language Processing (pp. 3781-3797). (Year: 2022).*

* cited by examiner

TECHNIQUES FOR USING GENERATIVE ARTIFICIAL INTELLIGENCE TO FORMULATE SEARCH ANSWERS

CROSS REFERENCES

The present application for patent claims the benefit of U.S. Provisional Patent Application No. 63/581,911 by Kempf et al., entitled "TECHNIQUES FOR USING GENERATIVE ARTIFICIAL INTELLIGENCE TO FORMULATE SEARCH ANSWERS," filed Sep. 11, 2023, which is assigned to the assignee hereof and which is expressly incorporated by reference herein.

FIELD OF TECHNOLOGY

The present disclosure relates generally to database systems and data processing, and more specifically to techniques for using generative artificial intelligence (AI) to formulate search answers.

BACKGROUND

A cloud platform (i.e., a computing platform for cloud computing) may be employed by multiple users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing, and preparing communications, and tracking opportunities and sales.

DETAILED DESCRIPTION

Figure 1:
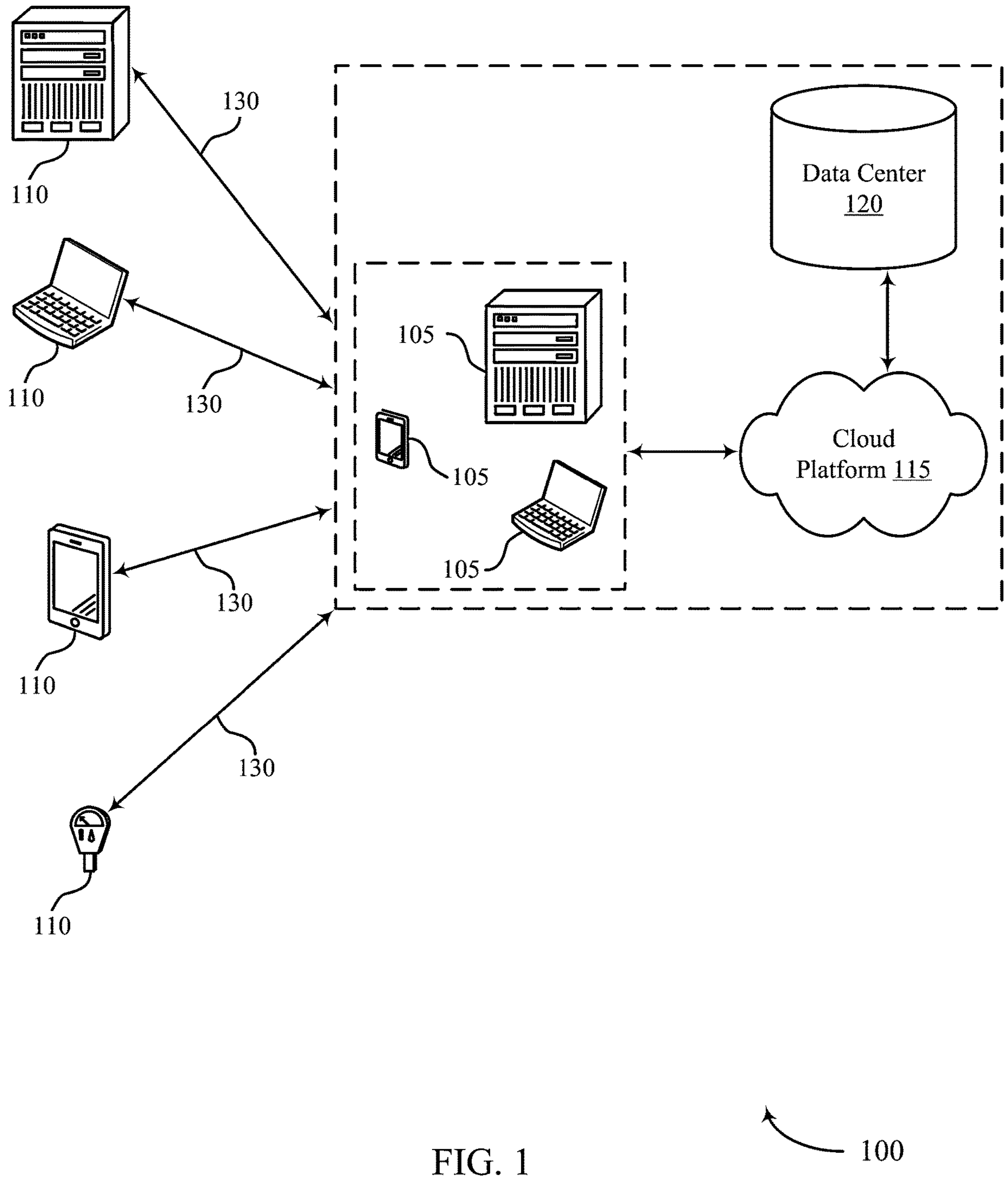
FIGS. 1 through 3 show examples of data processing systems that support techniques for using generative AI to formulate search answers in accordance with aspects of the present disclosure.

In some examples of database search systems, a user may input a query into the system and may receive a response from the system. The response may include one or more articles which may contain information relevant to the query submitted by the user. However, in some examples, the response may include extraneous information, such as portions of the one or more articles which may contain information that is not relevant to the query submitted by the user. In some other examples, the user may submit the query to a human agent, who may search the one or more articles for the relevant information. Accordingly, the user or agent may parse through the extraneous information to obtain the relevant information, which may increase the time it takes to obtain a relevant query response and thus negatively impact user experience.

Accordingly, techniques described herein may allow for a data processing system to return one or more passages partitioned from the one or more articles, which may allow the user to identify relevant information more quickly. For example, the data processing system may partition the articles into passages and may generate one or more token-based objects (e.g., keywords) and one or more vector-based objects associated with each passage. The data processing system may store a search index associated with each token-based object and each vector-based object. The data processing system may convert the query (e.g., a plain-text query) from the user into a vector-based object, and may compare the vector-based query with the one or more vector-based objects and token-based objects to identify a correlation between the query and one or more passages. Thus, the data processing system may return one or more relevant passages (e.g., smaller than the one or more articles), and the user may identify a relevant query response more quickly.

In some examples, the data processing system may further simplify a response provided to the user by utilizing a large language model (LLM). For instance, the data processing system may generate a prompt for the LLM including tokens (e.g., keywords) from the query and text from the one or more relevant passages. The LLM may return a response which summarizes the key details of the relevant passages for the user. The data processing system may verify that the response is relevant, accurate, and formatted properly before returning the response to the user. Additionally, or alternatively, the data processing system may perform toxicity mitigation, feedback analysis, and content moderation to ensure that the response provided by the LLM adheres to all policies and standards of the data processing system.

Aspects of the disclosure are initially described in the context of an environment supporting an on-demand database service. Aspects of the disclosure are further illustrated by and described with reference to block diagrams, user interfaces, and process flows. Aspects of the disclosure are further illustrated by and described with reference to apparatus diagrams, system diagrams, and flowcharts that relate to search answers using generative artificial intelligence (AI).

FIG. 1 illustrates an example of a data processing system 100 for cloud computing that supports techniques for using generative AI to formulate search answers in accordance with various aspects of the present disclosure. The data processing system 100 includes cloud clients 105, contacts 110, cloud platform 115, and data center 120. Cloud platform 115 may be an example of a public or private cloud network. A cloud client 105 may access cloud platform 115 over network connection. The network may implement transfer control protocol and internet protocol (TCP/IP), such as the Internet, or may implement other network protocols. A cloud client 105 may be an example of a user device, such as a server, a smartphone, or a laptop. In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction 130. The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server, a laptop, a smartphone, or a sensor. In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with interactions 130 from the cloud client 105 over network connection, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

The data processing system 100 may include cloud clients 105, cloud platform 115, and data center 120. In some cases, data processing may occur at any of the components of the data processing system 100, or at a combination of these components. In some cases, servers may perform the data processing. The servers may be a cloud client 105 or located at data center 120.

The data processing system 100 may be an example of a multi-tenant system. For example, the data processing system 100 may store data and provide applications, solutions, or any other functionality for multiple tenants concurrently. A tenant may be an example of a group of users (e.g., an organization) associated with a same tenant identifier (ID) who share access, privileges, or both for the data processing system 100. The data processing system 100 may effectively separate data and processes for a first tenant from data and processes for other tenants using a system architecture, logic, or both that support secure multi-tenancy. In some examples, the data processing system 100 may include or be an example of a multi-tenant database system. A multi-tenant database system may store data for different tenants in a single database or a single set of databases. For example, the multi-tenant database system may store data for multiple tenants within a single table (e.g., in different rows) of a database. To support multi-tenant security, the multi-tenant database system may prohibit (e.g., restrict) a first tenant from accessing, viewing, or interacting in any way with data or rows associated with a different tenant. As such, tenant data for the first tenant may be isolated (e.g., logically isolated) from tenant data for a second tenant, and the tenant data for the first tenant may be invisible (or otherwise transparent) to the second tenant. The multi-tenant database system may additionally use encryption techniques to further protect tenant-specific data from unauthorized access (e.g., by another tenant).

Additionally, or alternatively, the multi-tenant system may support multi-tenancy for software applications and infrastructure. In some cases, the multi-tenant system may maintain a single instance of a software application and architecture supporting the software application in order to serve multiple different tenants (e.g., organizations, customers). For example, multiple tenants may share the same software application, the same underlying architecture, the same resources (e.g., compute resources, memory resources), the same database, the same servers or cloud-based resources, or any combination thereof. For example, the data processing system 100 may run a single instance of software on a processing device (e.g., a server, server cluster, virtual machine) to serve multiple tenants. Such a multi-tenant system may provide for efficient integrations (e.g., using application programming interfaces (APIs)) by applying the integrations to the same software application and underlying architectures supporting multiple tenants. In some cases, processing resources, memory resources, or both may be shared by multiple tenants.

As described herein, the data processing system 100 may support any configuration for providing multi-tenant functionality. For example, the data processing system 100 may organize resources (e.g., processing resources, memory resources) to support tenant isolation (e.g., tenant-specific resources), tenant isolation within a shared resource (e.g., within a single instance of a resource), tenant-specific resources in a resource group, tenant-specific resource groups corresponding to a same subscription, tenant-specific subscriptions, or any combination thereof. The data processing system 100 may support scaling of tenants within the multi-tenant system, for example, using scale triggers, automatic scaling procedures, scaling requests, or any combination thereof. In some cases, the data processing system 100 may implement one or more scaling rules to enable relatively fair sharing of resources across tenants. For example, a tenant may have a threshold quantity of processing resources, memory resources, or both to use, which in some cases may be tied to a subscription by the tenant.

In conventional query processing schemes, responses may include a wall of text, dependent on the customer for article content and formatting. Answers may additionally be limited to a single article. A quality of coverage and precisions may additionally be lower than one or more target quality and precision metrics. Further, current techniques may be unable to provide a short answer for factoid type question from knowledge (e.g., what is the help desk number, etc.). Raw informal content (e.g., cases, transcripts, etc.) may be noisy and an extractive-only approach may not work. Images or tables within knowledge articles may be removed from an answer. Extracted passages may not be personalized to the user and context. Extending or translating answers to multiple languages may require access to content in those languages (e.g., from customers). Current techniques may further involve additional database maintenance, such as maintenance of a separate passage indexing pipeline in addition to articles. Customer entered synonyms or document popularity signals may not be used. Answers may be deleted after a period of time (e.g., 24 hours) has passed.

It should be appreciated by a person skilled in the art that one or more aspects of the disclosure may be implemented in a data processing system 100 to solve problems other than those described above. Furthermore, aspects of the disclosure may provide technical improvements to "conventional" systems or processes. However, the description and appended drawings only include example technical improvements resulting from implementing aspects of the disclosure, and accordingly do not represent all of the technical improvements provided within the scope of the claims.

Figure 2:
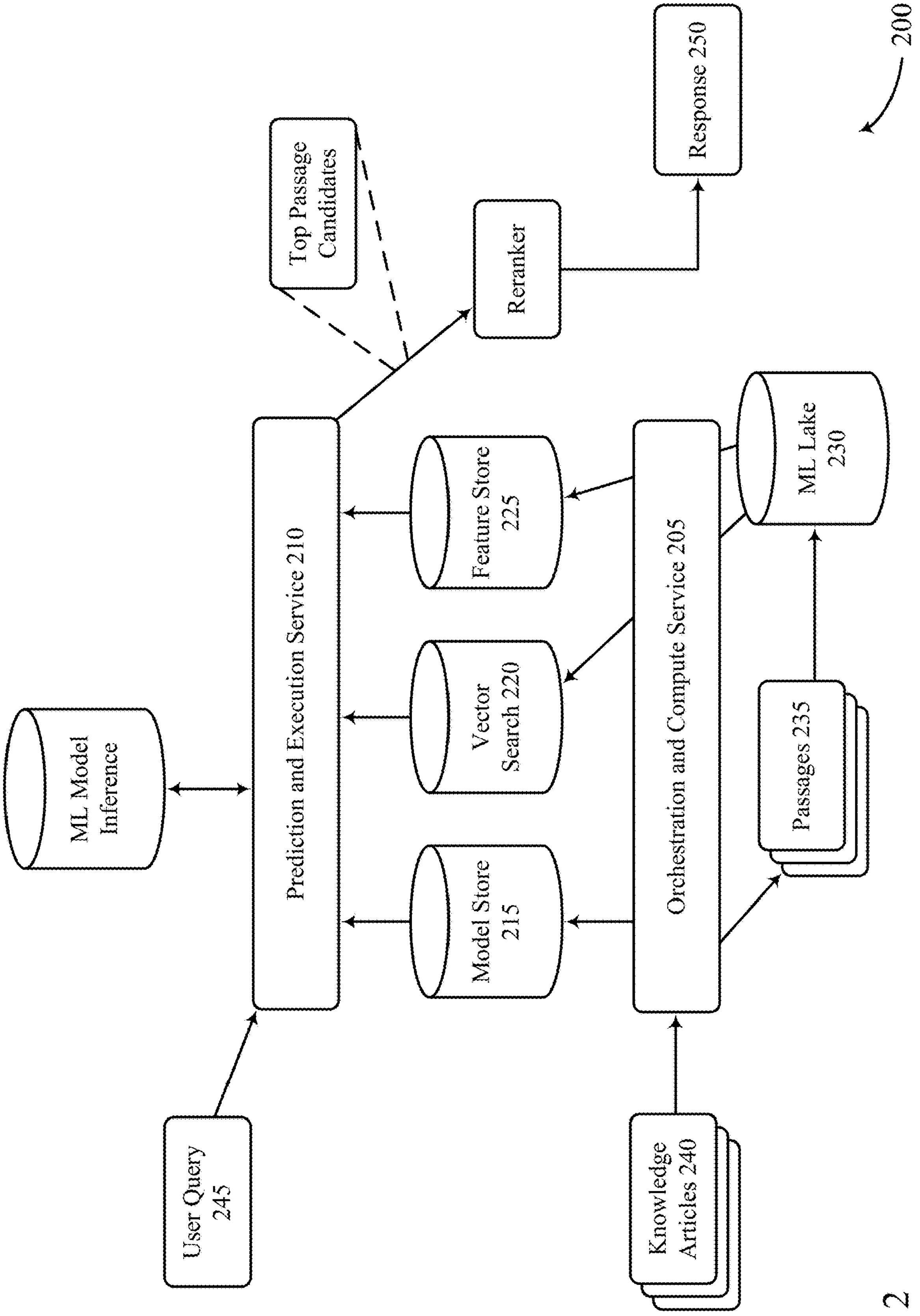

FIG. 2 shows an example of a data processing system 200 that supports techniques for using generative AI to formulate search answers in accordance with aspects of the present disclosure. The data processing system 200 may implement one or more aspects of the data processing system 100. For example, the data processing system 200 includes an orchestration and compute service 205 (also referred to as an orchestration and compute system), a prediction and execution service 210 (also referred to as a prediction and execution system), a model store 215, a vector search database 220, a feature store database 225, and a machine learning (ML) data lake 230, which may be individually or collectively hosted by the cloud platform 115 (or components thereof). The data processing system 200 illustrates an example of an indexing and serving process that supports one or more aspects of the innovative subject matter described herein.

In accordance with the techniques described herein, the data processing system 200 may return one or more passages 235 (also referred to as "chunks") partitioned from one or more articles 240 (also referred to as "data objects"), which may enable the data processing system 200 to identify relevant information more quickly. For example, the data processing system 200 may partition the articles 240 into passages 235 and extract one or more token-based objects (e.g., keywords) and one or more vector-based objects associated with each passage 235. The data processing system 200 may create a token search index and a vector search index. The data processing system 200 may convert a user query 245 (also referred to as a natural language input or a plain-text query) into a vector-based object and compare the user query 245 with the token search index and/or the vector search index to identify a correlation between the user query 245 and one or more passages 235. Accordingly, the data processing system 200 may return one or more relevant passages 235 (e.g., excerpts from the articles 240).

The data processing system 200 illustrates an indexing and serving pipeline that improves search relevance and experience for question-like queries. Some search programs may support keyword-based queries, such as "premium close account." The techniques described herein may also support natural language queries, such as "how do I close my premium account?" In response, the data processing system 200 may return a short passage 235 from an article 240 answering the user query 245, such as "To close your premium account, click on the Account Settings tab in your profile page, and navigate to close account."

To support the techniques described herein, knowledge articles 240 may be partitioned into passages 235 (which can match the user query 245 independently). Each passage 235 may have metadata, such as a record ID, a list of text field names ("Description", "Resolution", etc.) and actual text data for each text field (e.g., "This is an article about closing your account"). The passage information may be generated and stored in the feature store database 225.

To generate dense (e.g., vector-based) indexes, passages 235 may be passed through a deep learning embedding model, which may turn each passage 235 into an array of floats (e.g., a "dense vector") that are indexed. To generate sparse (e.g., token-based) indexes, passages 235 may be associated with token-based indexes. In some implementations, a training flow for such processes may involve an indexing flow based on public hypertext markup language (HTML)-scraped data.

To index the passages 235, a request may be sent to multiple virtual storage (MVS). The orchestration and compute service 205 may then begin the flow. In some examples, triggering the flow may involve a scheduled job running periodically (e.g., every 24 hours). The orchestration and compute service 205 may parse and validate configuration information. The orchestration and compute service 205 may then retrieve text fields (e.g., from trainingFields in customerParams) and pull knowledge article entity data, selecting fields by either pulling and/or filtering fields based on schema origin type, calling an ML Lake application programming interface (API), or calling a changelog API. The orchestration and compute service 205 may then use a ScanDatasetStep to obtain locations of the files in the ML Lake.

In turn, the orchestration and compute service 205 may create ML Lake paths (e.g., s3 paths) to store intermediate data using either CreateTableDatasetStep or CreateDraftLocationStep and CreateFileDatasetStep programs. The orchestration and compute service 205 may create two tables. Table 1 may be pushed to the feature store database 225. Table 1 may include fields like document_id, record_id, field_name, passage_text, etc. Table 2 may be pushed to Open Search dense (e.g., for vector-based objects) or Open Search sparse (e.g., for text-based objects). Table 2 may include fields like document_id, passage_text, and the like. Table 2 may also include the vectors and passage_text. In some examples, document_id may be interchangeable and/or refer to passage_id, or record_id, or both. The orchestration and compute service 205 may generate a payload and use a program to call an application.

The payload may contain a path (e.g., s3 path) to pull article data and a path to write Table 1 and Table 2. The application may pull data from the article data and extract passages 235 for Table 1 and Table 2. From the passage text, the orchestration and compute service 205 may call a model loaded from disk and baked into the application container, which pulls it from an artifact at container instantiation time. In some examples, the model may be implemented or provided by the end user (e.g., a tenant of the data processing system 200). The orchestration and compute service 205 may call the model to obtain a vector embedding for Table 2. The application may return table locations (e.g., s3 locations) to the MVS. The orchestration and compute service 205 may generate the payload and read Table 1 and Table 2 to publish data to the feature store database 225. The feature store database 225 may read the ML Lake tables (containing passage information).

The orchestration and compute service 205 may generate the payload and use a GenericOpenSearchIndexStep with the path from Table 2 to index sparse or text-based data. Data input may include a tenant_id (e.g., an organization_id) and an ML lake table_name from a previous flow or step. The orchestration and compute service 205 may read an ML Lake file containing {document_id→passage_text} and index it to a key-word based sparse index (e.g., Open Search, an Elastic Search Sparse BM 25 index, Solr, etc.). The orchestration and compute service 205 may read a current index version in model store 215 or MVS for a given tenant or object. The orchestration and compute service 205 may push metadata (e.g., a new index version to use per tenant) to model store 215 or MVS. In some implementations, the orchestration and compute service 205 may delete one or more previous indexes.

To update the indexes, the orchestration and compute service 205 may read an ML Lake snapshot of data and write a new ML Lake Table when a job is triggered. The orchestration and compute service 205 may push data to feature store database 225 and the vector search database 220. The indexing flow may be scheduled to run periodically (e.g., every 24 hours). In some examples, to update the indexes, the orchestration and compute service 205 may create a new ML Lake changelog and store it for referencing in MVS/Model Store (e.g., every time the flow is run). The orchestration and compute service 205 may provide Changelog reference to the feature store database 225 and the vector search database 220.

Figure 3:
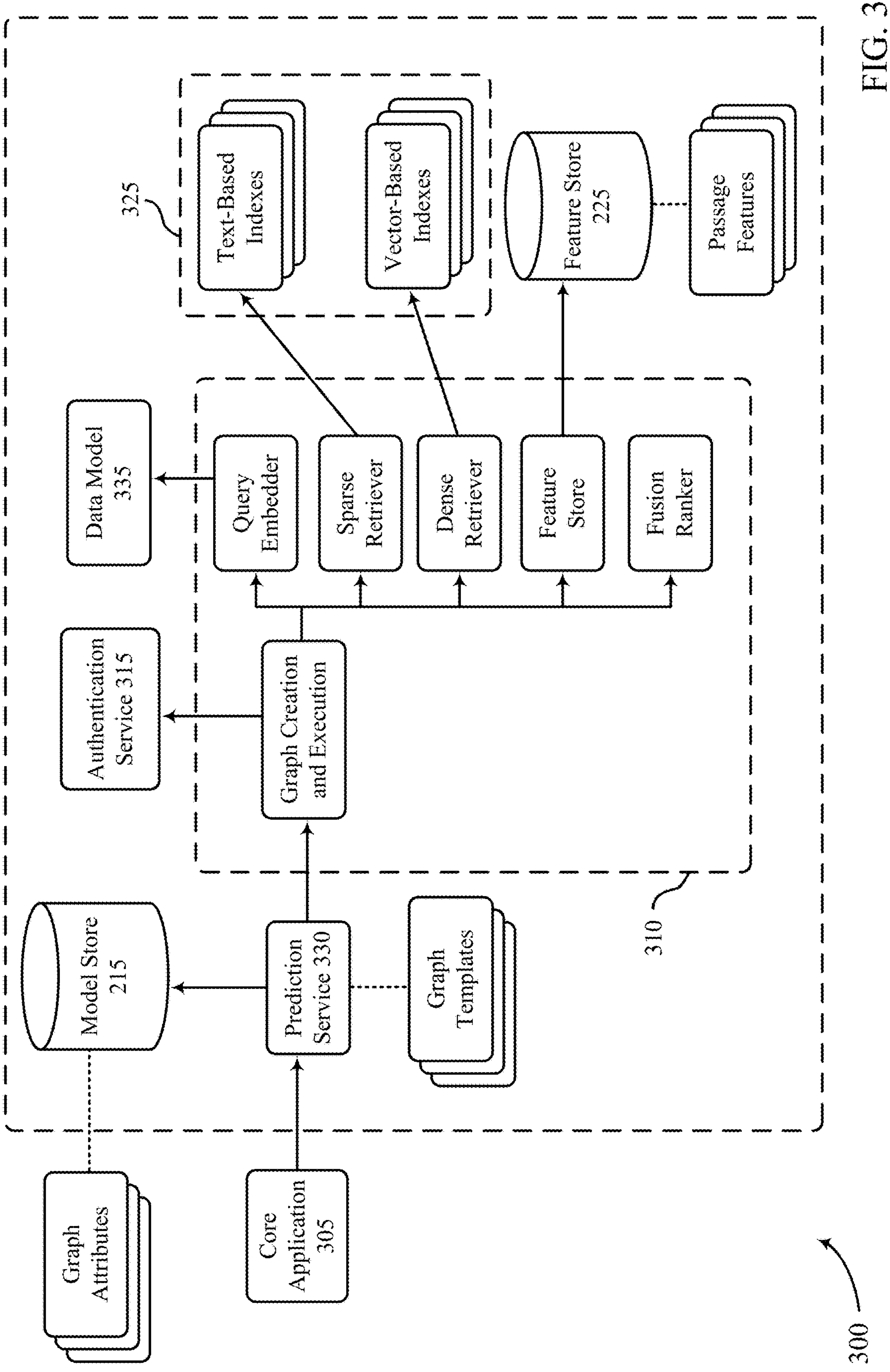

FIG. 3 shows an example of a data processing system 300 that supports techniques for using generative AI to formulate search answers in accordance with aspects of the present disclosure. The data processing system 300 may implement one or more aspects of the data processing system 100 or the data processing system 200, as shown and described with reference to FIGS. 1 and 2. For example, the data processing system 300 includes a core application 305, a model store 215, a graph execution service (GES) 310, an authentication service 315, an open source database 325, and a feature store database 225, which may be individually or collectively hosted by one or more elements of the cloud platform 115, as shown and described with reference to FIG. 1.

To support the techniques described herein, a user may submit a query to the core application 305. In turn, the core application 305 may call a prediction service 330 with a JavaScript Object Notation (JSON) payload, which may be serialized as part of a protocol buffer into a byte array. The prediction service 330 may pass this information to the GES 310, which may deserialize the payload and execute the graphs. The prediction service 330 may invoke the open source database 325, which may be hosted using Terraform, the feature store database 225, or a build your own model (BYOM) implementation, such as a pytorch model. The response payload may be sent back to the caller (the core application 305).

As described herein, a serving pipeline may return an answer to a user query 245 based on the content of relevant articles 240. The user query 245 may be converted into a vector using a BYOM data model 335 (which may be the same model used for the indexing pipeline). In some implementations, this operation may be performed using a BYOM Text Embedder component. A semantic search engine may retrieve top passage IDs that match the user query 245. This retrieval may be performed in two parallel calls, producing two results lists (where elements are ranked by relevance).

A dense retrieval component may provide the query vector as an input and compare it to all passage vectors created during the indexing pipeline (e.g., using vector similarity techniques). A sparse retrieval component may provide the text-based query and retrieve passages 235 based on search document token matches. From the top passage IDs returned from the semantic search result lists, passage text may be extracted and stored with passage information in the feature store database 225 (e.g., during the indexing pipeline). A fusion ranking component may blend the results from dense retrieval and sparse retrieval, re-ranking them into a single list.

Figure 4:
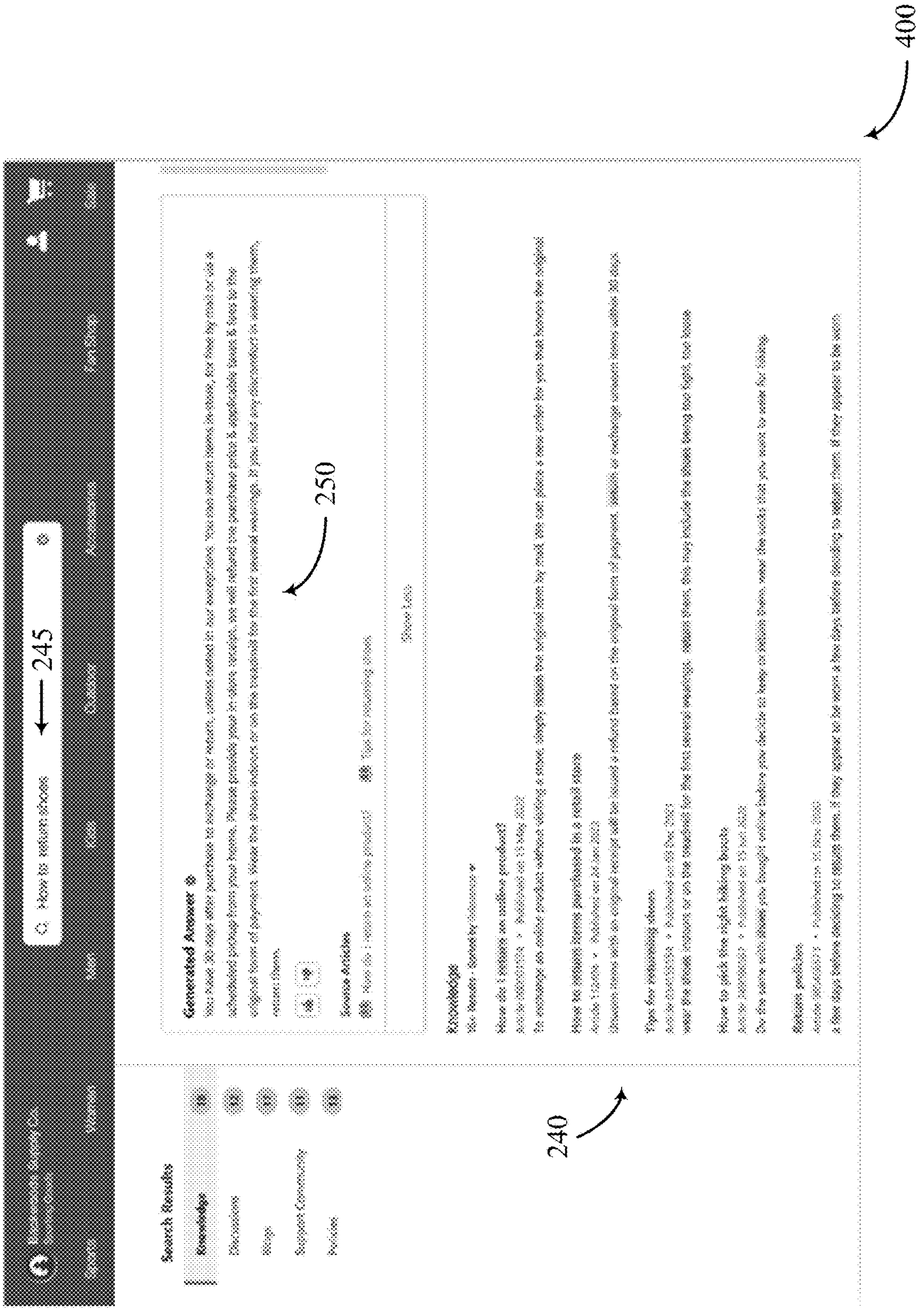
FIG. 4 shows an example of a user interface that supports techniques for using generative AI to formulate search answers in accordance with aspects of the present disclosure.

FIG. 4 shows an example of a user interface 400 that supports techniques for using generative AI to formulate search answers in accordance with aspects of the present disclosure. The user interface 400 may implement one or more aspects of the data processing systems shown and described with reference to FIGS. 1 through 3. For example, the user interface 400 may be presented or otherwise displayed to an end-user of the data processing system 200. The user interface 400 shows an example of a grounded LLM response 250 that includes data extracted from passages 235 of articles 240 containing tenant-specific information.

As described herein, the data processing system 200 may use an LLM to provide curated query responses. In some implementations, the data processing system 200 may generate an LLM prompt, including tokens (e.g., keywords) from the user query 245 and text extracted from one or more relevant passages of articles 240. The LLM may return a response 250, summarizing the relevant passages according to the LLM prompt. The data processing system 200 may, in some cases, perform a validation process to verify that the response 250 is relevant, accurate, and formatted properly before returning the response 250 to the user.

Instead of delivering partial or verbose answers extracted from individual knowledge articles 240, a complete answer can be generated from multiple articles 240 to save agents time when resolving cases. LLM-summarized answers (e.g., the response 250) can be created from a short list of candidate articles 240 and fields the user has access to, using a retrieval and ranking system to ground the response 250 in customer knowledge and minimize LLM hallucinations. From a user experience perspective, the articles 240 used to develop the response 250 may be cited to the user, as shown in FIG. 4. The user may also have the option to easily indicate and report incorrect and/or inappropriate answers.

Users may not be familiar with a knowledge base and the terminology used therein, so providing users with generative search answers can shorten the time it takes to help users resolve issues, and increase the number of cases resolved without manual intervention. For business-to-consumer (B2C) use cases with high query volumes, the value of the experience for initial customers can be measured to help inform potential packaging options, such as usage limits and feature-based options. In some examples, the data processing system 200 can selectively choose which user queries are good candidates for generative search answers. The data processing system 200 can also make use of caches to help create the most cost efficient model for the quality target.

Figure 5:
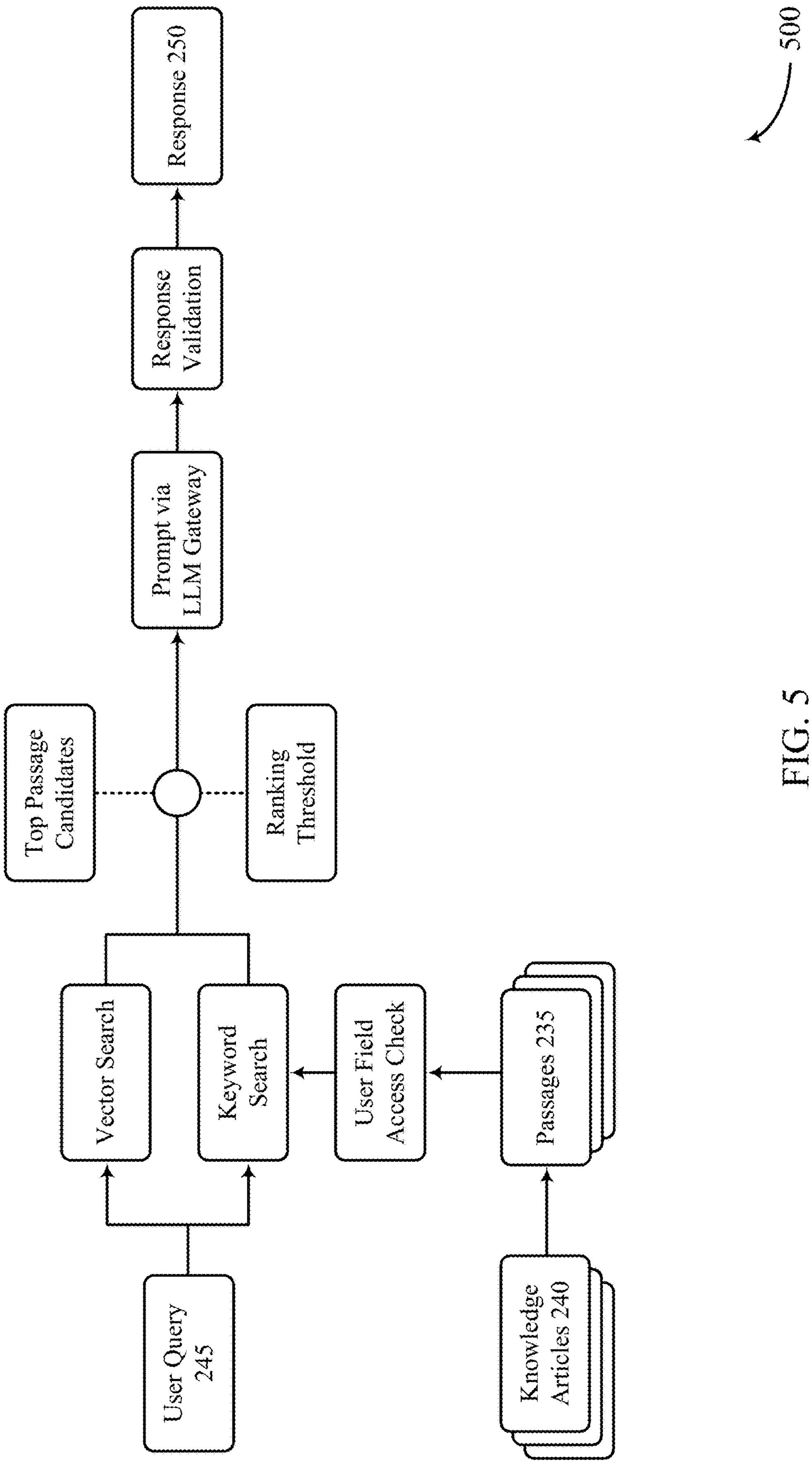
FIG. 5 shows an example of a block diagram that supports techniques for using generative AI to formulate search answers in accordance with aspects of the present disclosure.

FIG. 5 shows an example of a block diagram 500 that supports techniques for using generative AI to formulate search answers in accordance with aspects of the present disclosure. The block diagram 500 may implement one or more aspects of the data processing systems and/or user interfaces shown and described with reference to FIGS. 1 through 4. For example, the block diagram 500 includes passages 235 (also referred to as article chunks), articles 240 (also referred to as knowledge articles), a user query 245 (also referred to as a natural language input or a plain-text query), and a response 250 (also referred to as a formulated search answer), which may be examples of corresponding elements described with reference to FIG. 2.

The indexing pipeline described herein may extract articles 240 and produce tables, search indexes, and artifacts that are used for serving processes. Articles 240 may be split into passages 235 and converted into vectors (e.g., embeddings) by calling a model that converts text into vectors. These vectors may be stored as a new index in the semantic search engine system. Knowledge article passage text and features may be pushed to the feature store database 225. References to semantic search indexes and feature store tables may be pushed to model store 215 as metadata.

As described herein, the data processing system 200 may retrieve one or more passages 235 partitioned from one or more articles 240. To do so, the data processing system 200 may partition the articles 240 into passages 235 and extract one or more token-based objects (e.g., keywords) and one or more vector-based objects from each passage 235. The data processing system 200 may create a token search index and a vector search index. When a user query 245 is later received, the data processing system 200 may convert the user query 245 into a vector-based object and compare the user query 245 with the token search index and/or the vector search index to identify a correlation between the user query 245 and one or more passages 235. Accordingly, the data processing system 200 may return one or more relevant passages 235 (e.g., excerpts from the articles 240).

In some examples, one or more relevant passages 235 may be filtered and ranked, as described with reference to FIG. 3. The relevant passages 235 may be used to generate a prompt that includes tokens from the user query 245 and the top passage text content extracted from the feature store database 225. The prompt may then be passed to the LLM gateway, which may retrieve, verify, and return the response 250 from the LLM back to the user.

Figure 6:
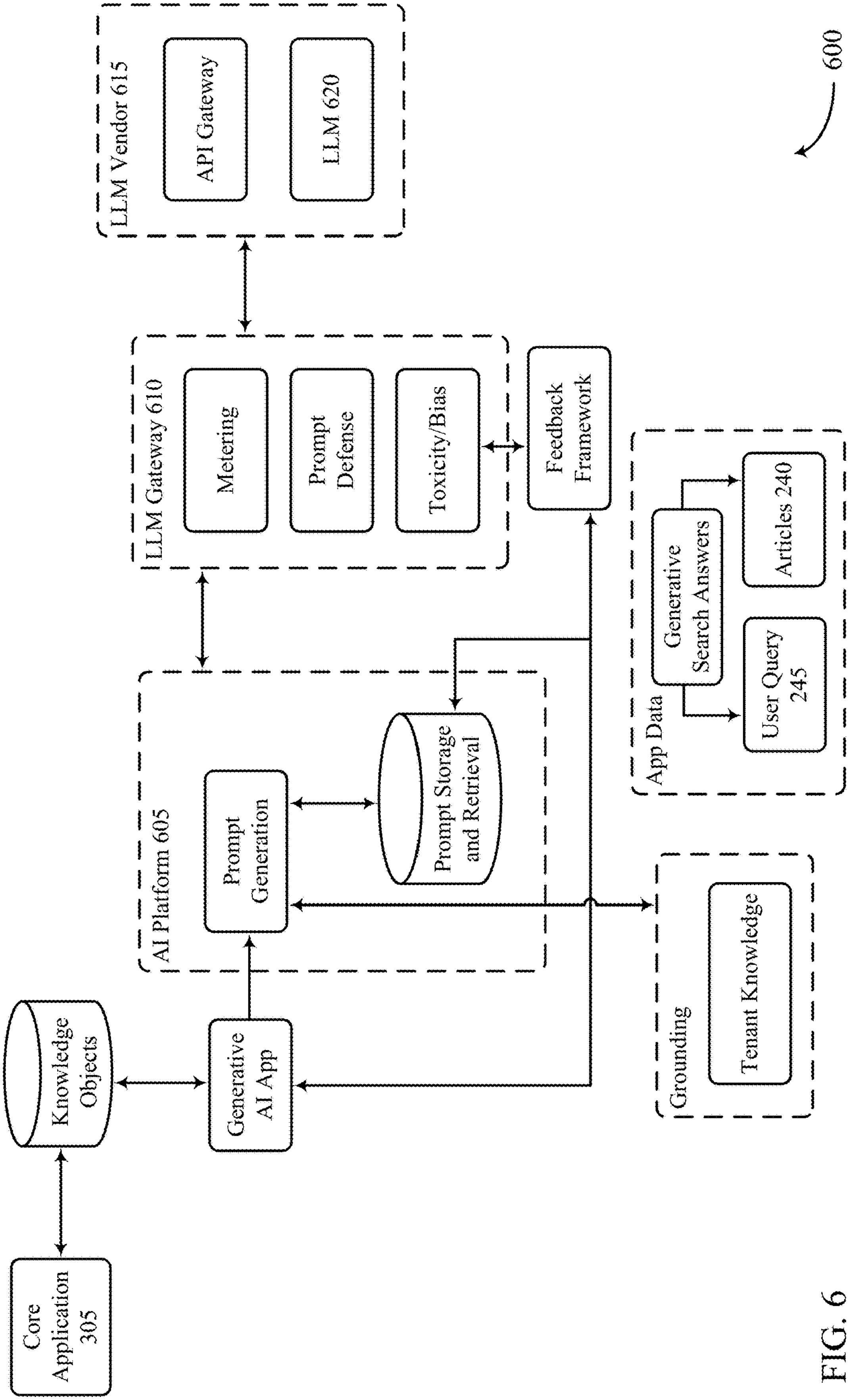
FIG. 6 shows an example of a data processing system that supports techniques for using generative AI to formulate search answers in accordance with aspects of the present disclosure.

FIG. 6 shows an example of a data processing system 600 that supports techniques for using generative AI to formulate search answers in accordance with aspects of the present disclosure. The data processing system 600 includes an AI platform 605, an LLM gateway 610, a core application 305, and an LLM vendor 615. The AI platform 605, the core application 305, and/or the LLM gateway 610 may be implemented (at least in part) by elements of the data processing system 200 or the cloud platform 115, as shown and described with reference to FIGS. 1 and 2.

In some examples, the data processing system 600 may use an LLM 620 provided by the LLM vendor 615 to formulate generative search answers (such as the response 250 shown and described with reference to FIG. 2). The LLM vendor 615 may include LLMs that are trained and hosted internally to a company (e.g., in-house models), LLMs that are trained on public data and/or hosted or publicly accessible (e.g., external models), or both. The data processing system 600 may communicate with the LLM vendor 615 via the LLM gateway 610. In accordance with the techniques described herein, the data processing system 600 may generate an LLM prompt, which may include tokens (e.g., keywords) from the user query 245 and one or more relevant passages 235 extracted from articles 240. In some implementations, the LLM gateway 610 may remove personally identifying information (PII) from the prompt before it is sent to the LLM vendor 615.

Accordingly, the LLM 620 may return a response 250, which can include content from the relevant passages 235, summarized according to the instructions provided. Upon receiving a response from the LLM vendor 615, the LLM gateway 610 may perform a validation process to verify that the response 250 is relevant, accurate, and formatted properly before returning the response 250 to the user. This validation process may include prompt defense, content moderation, toxicity/bias mitigation, etc.

The LLM 620 may have a zero data retention policy, such that all data provided with the prompt is deleted after the response 250 is returned to the LLM gateway 610. In some examples, the response 250 may include links or citations to the actual articles 240 that were used to formulate the response 250. The user may be presented with the option to provide feedback on the response 250. The AI platform 605 of the data processing system 600 may use this feedback to improve the quality of subsequent query responses. In some implementations, LLM prompts and/or responses may be cached for a period of time (e.g., 30 days) and used to handle similar queries.

Figure 7:
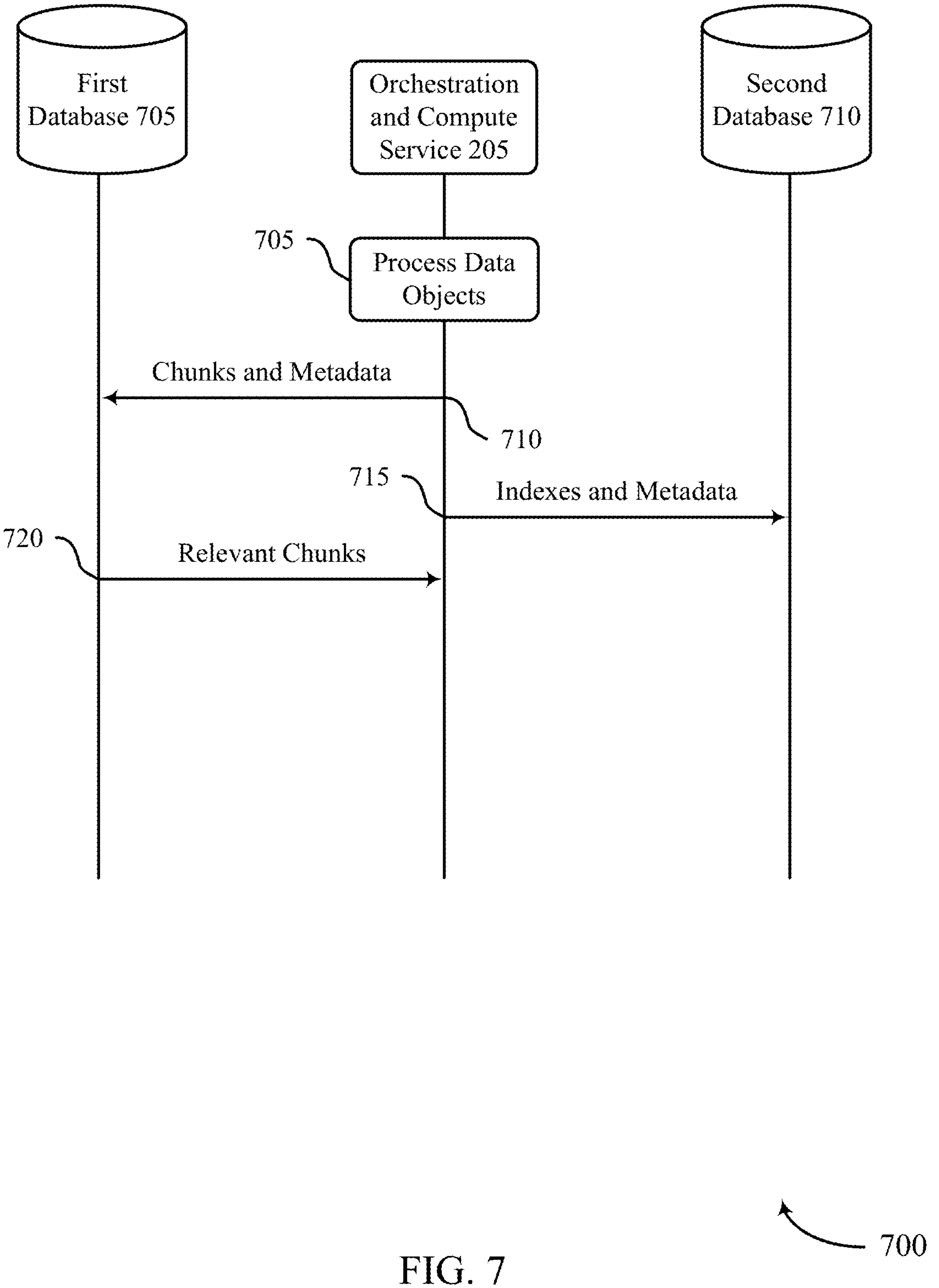
FIGS. 7 and 8 show examples of process flows that support techniques for using generative AI to formulate search answers in accordance with aspects of the present disclosure.

FIG. 7 shows an example of a process flow 700 that supports techniques for using generative AI to formulate search answers in accordance with aspects of the present disclosure. The process flow 700 may implement one or more aspects of the data processing system 200, as shown and described with reference to FIG. 2. For example, the process flow 700 includes an orchestration and compute service 205, a first database 705 (such as the feature store database 225 described with reference to FIG. 2), and a second database 710 (such as the model store 215 described with reference to FIG. 2). In the following description of the process flow 700, operations between the orchestration and compute service 205, the first database 705, and the second database 710 may be added, omitted, or performed in a different order (with respect to the exemplary order shown).

At 705, the orchestration and compute service 205 may obtain a set of data objects (e.g., knowledge articles 240) that contain tenant-specific information (such as answers to frequently asked questions (FAQ), troubleshooting information, guides, and so on). In some implementations, the orchestration and compute service 205 may retrieve the set of data objects from a tenant knowledge database. Once retrieved, the orchestration and compute service 205 may dynamically partition the set of data objects into various chunks (e.g., passages 235) that contain excerpts of the tenant-specific information. Partitioning the data objects into chunks may facilitate faster indexing and search operations, among other benefits. In some implementations, the orchestration and compute service 205 may dynamically partition the data objects by splitting a corpus of text into passages 235 based on a set of HTML tags present in the source code of various knowledge articles 240.

Accordingly, the orchestration and compute service 205 may generate a set of dense vectors (also referred to as vector-based objects) and a set of sparse tokens (also referred to as token-based objects) to represent the various chunks of the data objects retrieved at 705. The set of dense vectors may be used for vector-based search, whereas the set of sparse tokens may be used for token-based search. At 710, the orchestration and compute service 205 may store the various chunks and first metadata in the first database 705. In some implementations, the first metadata may include passage IDs, record IDs, field names, text, or HTML tags associated with the chunks.

At 715, the orchestration and compute service 205 may create a vector search index (also referred to as a first search index) and a token search index (also referred to as a second search index) based on the set of dense vectors and the set of sparse tokens. The vector search index and/or the token search index may be stored in the second database 710. In some implementations, the second database 710 may be implemented using Amazon Web Services (AWS) Open Source Search Engine. However, other search indexing schemes and data providers are also contemplated within the scope of the present disclosure. When creating the first search index and the second search index, the orchestration and compute service 205 may generate and store corresponding execution graph parameters in the first database 705 and/or the second database 710.

At 720, the orchestration and compute service 205 may retrieve one or more chunks from the first database 705 in association with using the vector search index and/or the token search index to identify a correlation (e.g., semantic similarity) between the one or more chunks and a natural language input (such as the user query 245 shown and described with reference to FIG. 2). In some implementations, the orchestration and compute service 205 or the prediction and execution service 210 may generate a vector representation of the natural language input by using a text embedding function to process various tokens in the natural language input.

Figure 8:
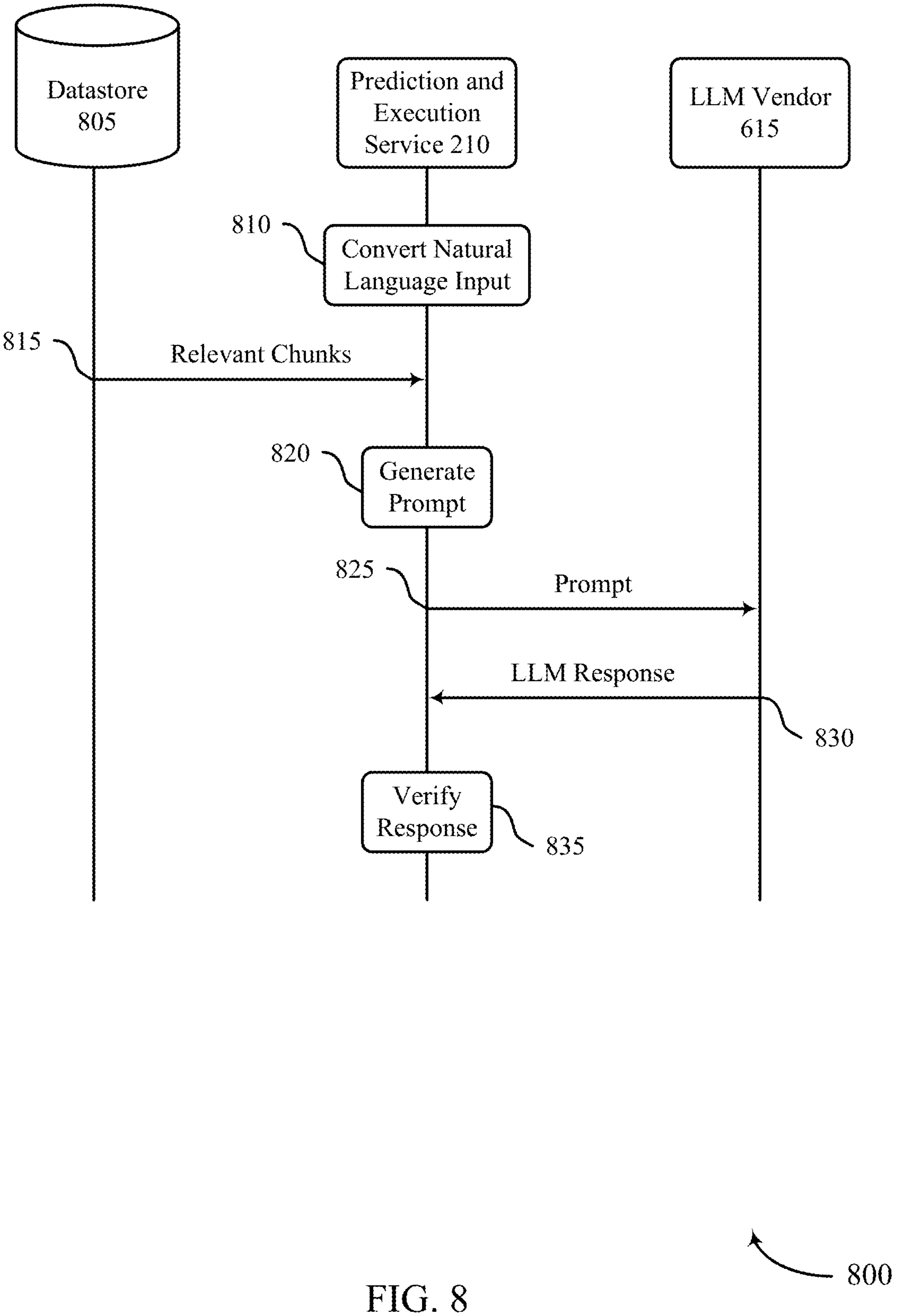

FIG. 8 shows an example of a process flow 800 that supports techniques for using generative AI to formulate search answers in accordance with aspects of the present disclosure. The process flow 800 may implement one or more aspects of the data processing system 200 and the data processing system 600, as shown and described with reference to FIGS. 2 and 6. For example, the process flow 800 includes a prediction and execution service 210, an LLM vendor 615, and a datastore 805 (such as the feature store database 225 shown and described with reference to FIG. 2). In the following description of the process flow 800, operations between the prediction and execution service 210, the LLM vendor 615, and the datastore 805 may be added, omitted, or performed in a different order (with respect to the exemplary order shown).

At 810, the prediction and execution service 210 may convert a natural language input (such as the user query 245 described with reference to FIG. 2) into a vector by using a text embedding function to process one or more tokens in the natural language input. At 815, the prediction and execution service 210 may retrieve a set of chunks (e.g., passages 235) from the datastore 805 in association with using one or more search indexes (such as a dense search index and a sparse search index) to compare the vector and/or the one or more tokens from the natural language input to vectors and tokens in the set of chunks.

In some implementations, the prediction and execution service 210 may rank the set of chunks retrieved from the datastore 805 (with respect to query relevance) by computing a set of vector-based relevancy metrics and a set of token-based relevancy metrics for each chunk. These metrics may indicate how similar a particular chunk is to the natural language input. The ranking process may, in some cases, involve combining a first set of passage IDs retrieved from a first search index of vector-based objects and a second set of passage IDs retrieved from a second search index of token-based objects into a single ranked list of passages to use for prompt generation. In some examples, the prediction and execution service 210 may also remove chunks (e.g., passages) with vector-based relevancy metrics or token-based relevancy metrics below a given threshold.

At 820, the prediction and execution service 210 may generate a prompt that includes tokens from the natural language input, tokens from one or more of the chunks retrieved from the datastore 805, and instructions for generating a response to the natural language input. In some implementations, the prediction and execution service 210 may perform a user field access check to verify that the user (from which the natural language input was received) is authorized to view or access the relevant chunks before generating the prompt. If, for example, the prompt text contains any PII (such as a phone number, email address, street address, or other sensitive information), the prediction and execution service 210 may remove or mask (e.g., anonymize) the PII before the prompt is sent.

At 825, the prediction and execution service 210 may transmit the prompt to the LLM vendor 615 via an LLM gateway 610. The LLM vendor 615 may communicate with the LLM gateway 610 via a secure communication channel. Once the prompt is successfully received, the LLM 620 of the LLM vendor 615 may process the prompt according to the instructions provided. For example, the LLM 620 may analyze/process the various chunks of tenant-specific information in the prompt and formulate a query response 250 based on the instructions provided by the prediction and execution service 210. In some implementations, the LLM 620 may have a zero data retention policy, such that all data provided with the prompt is deleted after the response 250 is returned.

At 830, the LLM vendor 615 may return the query response 250 to the prediction and execution service 210 (via the LLM gateway 610). At 835, the LLM gateway 610 may verify the contents of the response 250 before it is returned to the user. In particular, the LLM gateway 610 may perform a relevancy check (to ensure the response is relevant to the original query) and confirm that the format of the response 250 and any citations therein conform to the instructions provided by the prediction and execution service 210. The LLM gateway 610 may also perform toxicity and bias mitigation, feedback analysis, and content moderation. In some implementations, the prompt and/or the response 250 provided by the LLM 620 may be cached and re-used for similar queries.

Figure 9:
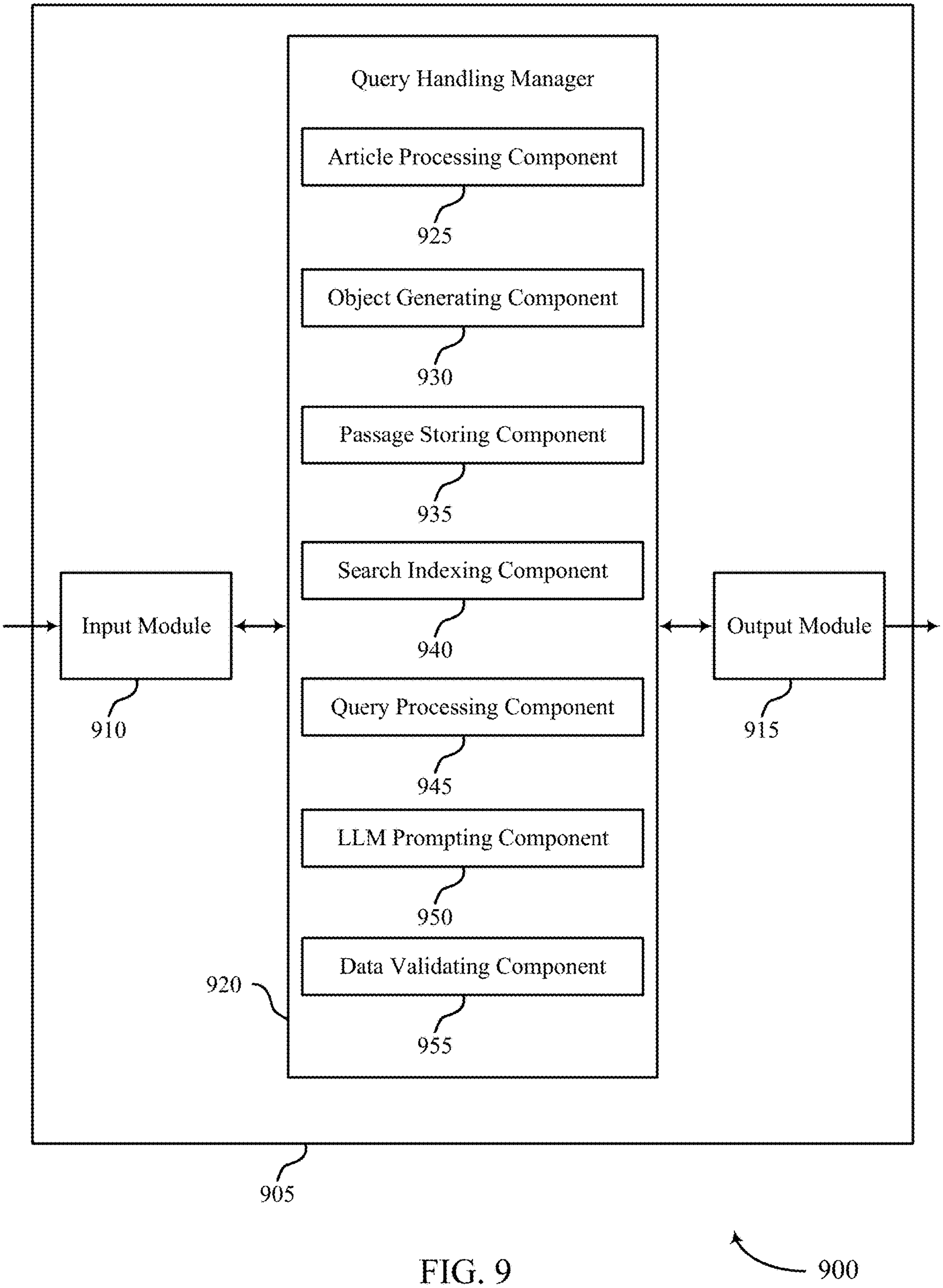
FIG. 9 shows a block diagram of an apparatus that supports techniques for using generative AI to formulate search answers in accordance with aspects of the present disclosure.

FIG. 9 shows a block diagram 900 of a device 905 that supports techniques for using generative AI to formulate search answers in accordance with aspects of the present disclosure. The device 905 may include an input module 910, an output module 915, and a query handling manager 920. The device 905, or one of more components of the device 905 (e.g., the input module 910, the output module 915, and the query handling manager 920), may include at least one processor, which may be coupled with at least one memory, to support the described techniques. Each of these components may be in communication with one another (e.g., via one or more buses).

The input module 910 may manage input signals for the device 905. For example, the input module 910 may identify input signals based on an interaction with a modem, a keyboard, a mouse, a touchscreen, or a similar device. These input signals may be associated with user input or processing at other components or devices. In some cases, the input module 910 may utilize an operating system such as iOS®, ANDROID®, MS-DOS®, MS-WINDOWS®, OS/2®, UNIX®, LINUX®, or another known operating system to handle input signals. The input module 910 may send aspects of these input signals to other components of the device 905 for processing. For example, the input module 910 may transmit input signals to the query handling manager 920 to support techniques for using generative AI to formulate search answers. In some cases, the input module 910 may be a component of an input/output (I/O) controller 1110 as described with reference to FIG. 11.

The output module 915 may manage output signals for the device 905. For example, the output module 915 may receive signals from other components of the device 905, such as the query handling manager 920, and may transmit these signals to other components or devices. In some examples, the output module 915 may transmit output signals for display in a user interface, for storage in a database or data store, for further processing at a server or server cluster, or for any other processes at any number of devices or systems. In some cases, the output module 915 may be a component of an I/O controller 1110 as described with reference to FIG. 11.

For example, the query handling manager 920 may include an article processing component 925, an object generating component 930, a passage storing component 935, a search indexing component 940, a query processing component 945, an LLM prompting component 950, a data validating component 955, or any combination thereof. In some examples, the query handling manager 920, or various components thereof, may be configured to perform various operations (e.g., receiving, monitoring, transmitting) using or otherwise in cooperation with the input module 910, the output module 915, or both. For example, the query handling manager 920 may receive information from the input module 910, send information to the output module 915, or be integrated in combination with the input module 910, the output module 915, or both to receive information, transmit information, or perform various other operations as described herein.

The article processing component 925 may be configured as or otherwise support a means for obtaining, by an orchestration and compute service of a data processing system, a set of articles including query answers and instructional content for users of the data processing system. The article processing component 925 may be configured as or otherwise support a means for dynamically partitioning the set of articles into a collection of passages that contain excerpts of the query answers and instructional content extracted from the set of articles. The object generating component 930 may be configured as or otherwise support a means for generating a set of vector-based objects and a set of token-based objects that represent the collection of passages containing the excerpts of data from the set of articles. The passage storing component 935 may be configured as or otherwise support a means for storing, in a first database of the data processing system, the collection of passages and first metadata associated with the collection of passages. The search indexing component 940 may be configured as or otherwise support a means for storing, in a second database of the data processing system, a first search index associated with the set of vector-based objects, a second search index associated with the set of token-based objects, and second metadata associated with the collection of passages. The search indexing component 940 may be configured as or otherwise support a means for retrieving one or more passages from the first database in association with using the first search index and the second search index to identify a correlation between the one or more passages and a plain-text query received from a user of the data processing system.

The query processing component 945 may be configured as or otherwise support a means for converting, by a prediction and execution service of a data processing system, a plain-text query into a vector-based object based on using a text embedding function to process one or more tokens in the plain-text query. The search indexing component 940 may be configured as or otherwise support a means for retrieving a set of passages from a first datastore of the data processing system based on using one or more search indexes stored in a second datastore of the data processing system to compare the vector-based object and the one or more tokens in the plain-text query to vector-based objects and token-based objects associated with the set of passages. The LLM prompting component 950 may be configured as or otherwise support a means for generating a prompt that includes tokens from the plain-text query, tokens from one or more of the set of passages retrieved from the first datastore, and instructions for creating a response to the plain-text query. The LLM prompting component 950 may be configured as or otherwise support a means for transmitting the prompt via an API gateway between the prediction and execution service of the data processing system and an LLM. The LLM prompting component 950 may be configured as or otherwise support a means for performing a data validation process to verify the response provided by the LLM before returning the response to a user associated with the plain-text query.

Figure 10:
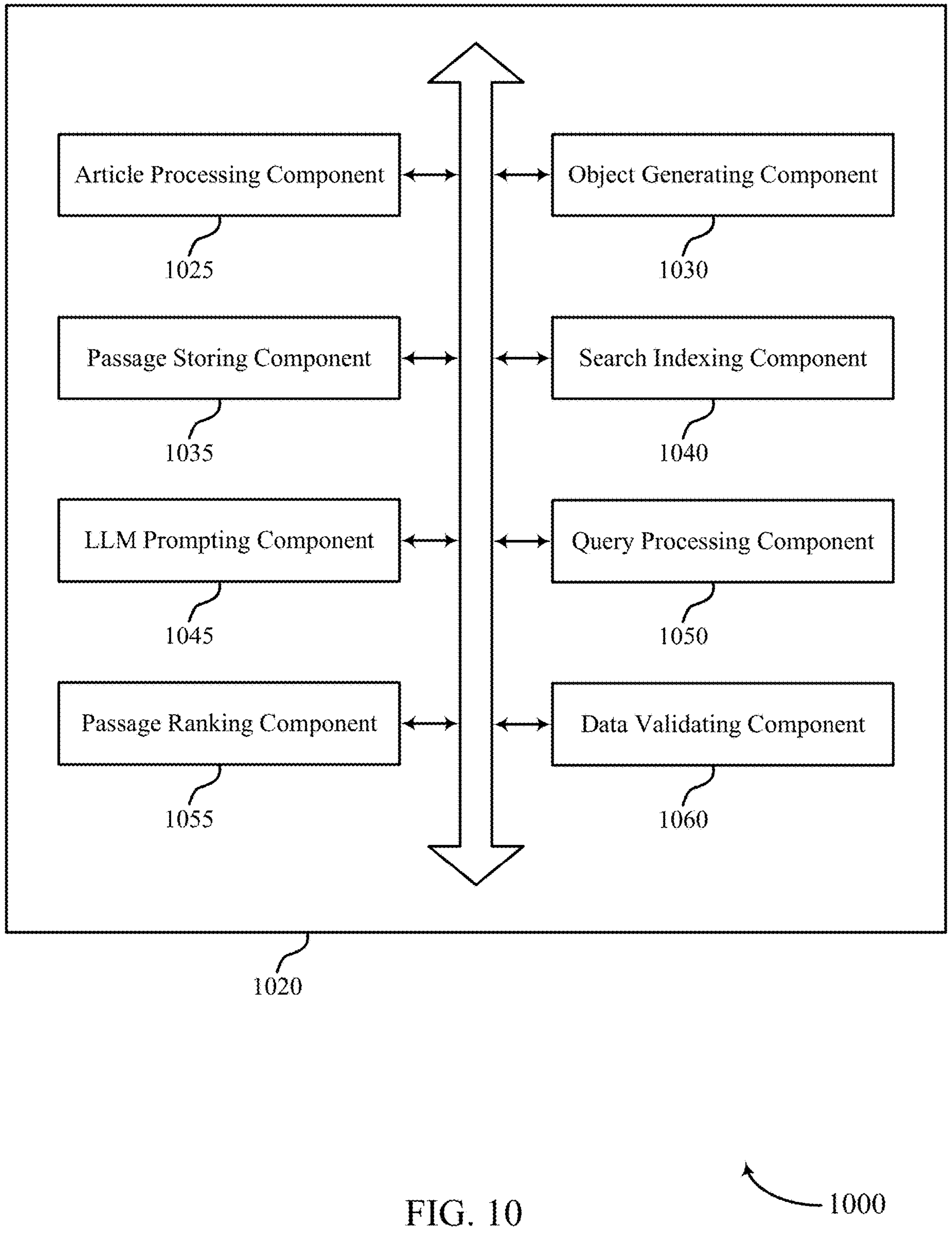
FIG. 10 shows a block diagram of a query handling manager that supports techniques for using generative AI to formulate search answers in accordance with aspects of the present disclosure.

FIG. 10 shows a block diagram 1000 of a query handling manager 1020 that supports techniques for using generative AI to formulate search answers in accordance with aspects of the present disclosure. The query handling manager 1020 may be an example of aspects of a query handling manager 920, as described herein. The query handling manager 1020, or various components thereof, may be an example of means for performing various aspects of techniques for using generative AI to formulate search answers as described herein. For example, the query handling manager 1020 may include an article processing component 1025, an object generating component 1030, a passage storing component 1035, a search indexing component 1040, an LLM prompting component 1045, a query processing component 1050, a passage ranking component 1055, and a data validating component 1060, or any combination thereof. Each of these components, or components of subcomponents thereof (e.g., one or more processors, one or more memories), may communicate, directly or indirectly, with one another (e.g., via one or more buses).

The article processing component 1025 may be configured as or otherwise support a means for obtaining, by an orchestration and compute service of a data processing system, a set of articles including query answers and instructional content for users of the data processing system. The article processing component 1025 may be configured as or otherwise support a means for dynamically partitioning the set of articles into a collection of passages that contain excerpts of the query answers and instructional content extracted from the set of articles. The object generating component 1030 may be configured as or otherwise support a means for generating a set of vector-based objects and a set of token-based objects that represent the collection of passages containing the excerpts of data from the set of articles. The passage storing component 1035 may be configured as or otherwise support a means for storing, in a first database of the data processing system, the collection of passages and first metadata associated with the collection of passages. The search indexing component 1040 may be configured as or otherwise support a means for storing, in a second database of the data processing system, a first search index associated with the set of vector-based objects, a second search index associated with the set of token-based objects, and second metadata associated with the collection of passages. The search indexing component 1040 may be configured as or otherwise support a means for retrieving one or more passages from the first database in association with using the first search index and the second search index to identify a correlation between the one or more passages and a plain-text query received from a user of the data processing system.

In some examples, the first metadata stored in the first database includes one or more passage identifiers, record identifiers, field names, text, or HTML information associated with the collection of passages.

In some examples, the search indexing component 1040 may be configured as or otherwise support a means for generating and storing one or more execution graph parameters associated with the first search index and the second search index in a datastore of the data processing system.

In some examples, to support dynamically partitioning the set of articles, the article processing component 1025 may be configured as or otherwise support a means for splitting a corpus of text into at least two passages based on a set of HTML tags present in source code of an article containing the corpus of text.

In some examples, the query processing component 1050 may be configured as or otherwise support a means for converting, by a prediction and execution service of the data processing system, the plain-text query received from the user into a vector-based object based on using a text embedding function to process one or more tokens in the plain-text query.

In some examples, the passage ranking component 1055 may be configured as or otherwise support a means for ranking the one or more passages retrieved from the first database of the data processing system by computing a set of vector-based relevancy metrics and a set of token-based relevancy metrics for the one or more of passages.

The object generating component 1030 may be configured as or otherwise support a means for converting, by a prediction and execution service of a data processing system, a plain-text query into a vector-based object based on using a text embedding function to process one or more tokens in the plain-text query. In some examples, the search indexing component 1040 may be configured as or otherwise support a means for retrieving a set of passages from a first datastore of the data processing system based on using one or more search indexes stored in a second datastore of the data processing system to compare the vector-based object and the one or more tokens in the plain-text query to vector-based objects and token-based objects associated with the set of passages. The LLM prompting component 1045 may be configured as or otherwise support a means for generating a prompt that includes tokens from the plain-text query, tokens from one or more of the set of passages retrieved from the first datastore, and instructions for creating a response to the plain-text query. The LLM prompting component 1045 may be configured as or otherwise support a means for transmitting the prompt via an API gateway between the prediction and execution service of the data processing system and an LLM. The data validating component 1060 may be configured as or otherwise support a means for performing a data validation process to verify the response provided by the LLM before returning the response to a user associated with the plain-text query.

In some examples, the passage ranking component 1055 may be configured as or otherwise support a means for ranking the set of passages retrieved from the first datastore of the data processing system by computing a set of vector-based relevancy metrics and a set of token-based relevancy metrics for the set of passages.

In some examples, to support ranking the set of passages, the passage ranking component 1055 may be configured as or otherwise support a means for combining a first set of passage identifiers retrieved from a first search index of vector-based objects and a second set of passage identifiers retrieved from a second search index of token-based objects into a single ranked list of passages to use for prompt generation.

In some examples, to support ranking the set of passages, the passage ranking component 1055 may be configured as or otherwise support a means for removing one or more passages with vector-based relevancy metrics or token-based relevancy metrics below a threshold.

In some examples, the data validating component 1060 may be configured as or otherwise support a means for performing a user field access check to verify that the user is authorized to view or access the set of passages before generating the prompt.

In some examples, to support generating the prompt, the LLM prompting component 1045 may be configured as or otherwise support a means for masking one or more words or tokens in the plain-text query that include PII or other sensitive data associated with the user of the data processing system.

In some examples, the response provided by the LLM contains text extracted from one or more passages and links to the one or more passages provided by the prediction and execution service of the data processing system.

In some examples, to support performing the data validation process, the data validating component 1060 may be configured as or otherwise support a means for performing a comparison between tokens in the response provided by the LLM, tokens in the plain-text query provided by the user, and tokens in the set of passages retrieved from the data processing system.

In some examples, to support performing the data validation process, the data validating component 1060 may be configured as or otherwise support a means for verifying that a format of the response and any citations therein conform to the instructions provided by the prediction and execution service.

In some examples, to support performing the data validation process, the data validating component 1060 may be configured as or otherwise support a means for analyzing data in the response provided by the LLM for toxicity and bias mitigation, feedback analysis, and content moderation.

In some examples, to support transmitting the prompt to the LLM, the LLM prompting component 1045 may be configured as or otherwise support a means for establishing a secure communication channel between the prediction and execution service and a provider of the LLM, where the prompt and the response are communicated via the secure communication channel.

In some examples, the LLM is configured to delete all data provided by the prediction and execution service after returning the response.

In some examples, the LLM prompting component 1045 may be configured as or otherwise support a means for retaining the prompt and the response in a cache for a tenant-configured retention period. In some examples, the query processing component 1050 may be configured as or otherwise support a means for using one or both of the prompt or the response to process subsequent queries from other users of the data processing system.

In some examples, the article processing component 1025 may be configured as or otherwise support a means for obtaining, by an orchestration and compute service of the data processing system, a set of articles including query answers and instructional content for users of the data processing system. In some examples, the article processing component 1025 may be configured as or otherwise support a means for dynamically partitioning the set of articles into a collection of passages that contain excerpts of the query answers and instructional content extracted from the set of articles.

In some examples, to support dynamically partitioning the set of articles, the article processing component 1025 may be configured as or otherwise support a means for splitting a corpus of text into at least two passages based on a set of HTML tags present in source code of an article containing the corpus of text.

Figure 11:
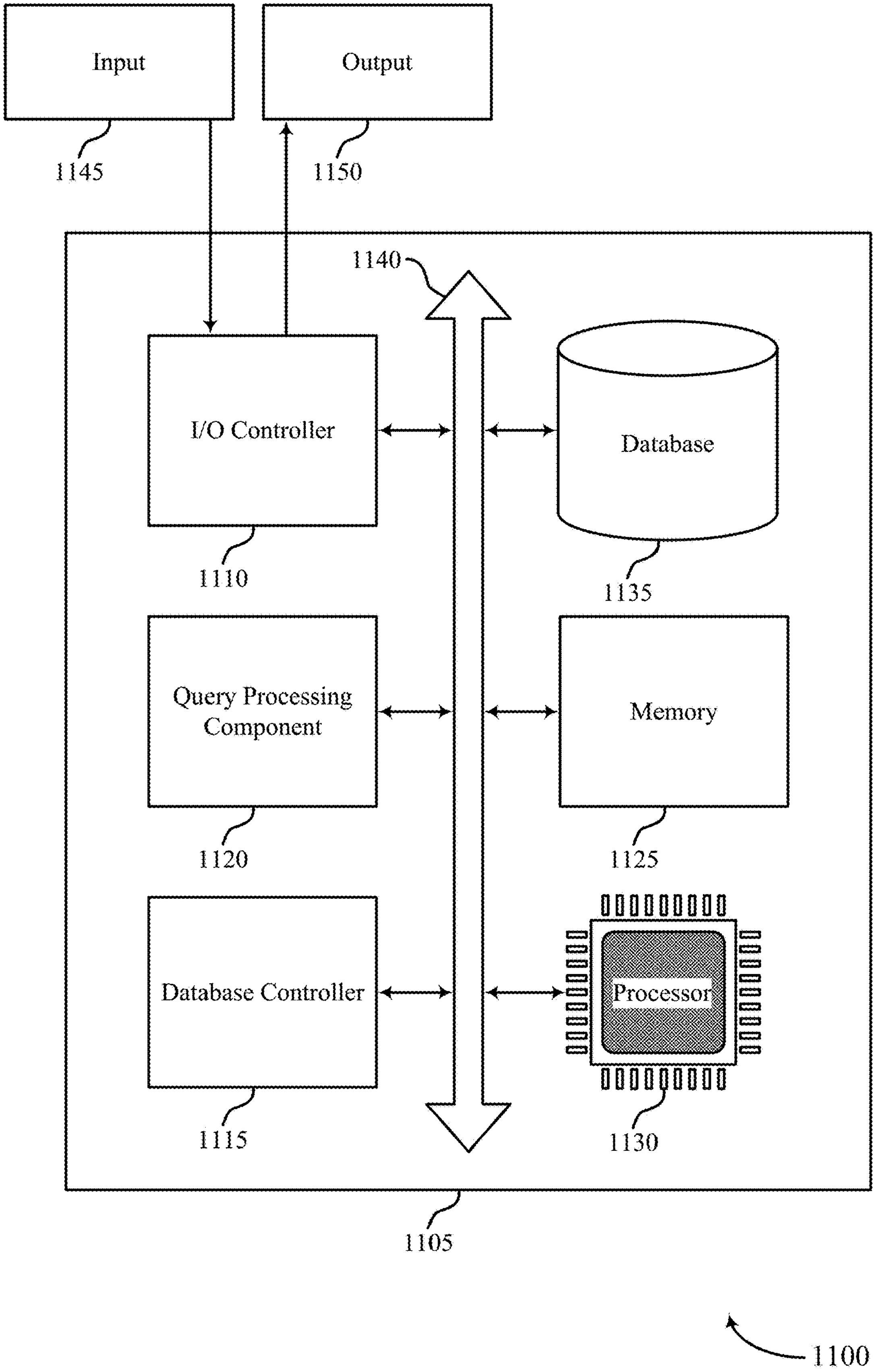
FIG. 11 shows a diagram of a system including a device that supports techniques for using generative AI to formulate search answers in accordance with aspects of the present disclosure.

FIG. 11 shows a diagram of a system 1100 including a device 1105 that supports techniques for using generative AI to formulate search answers in accordance with aspects of the present disclosure. The device 1105 may be an example of or include the components of a device 905 as described herein. The device 1105 may include components for bi-directional data communications including components for transmitting and receiving communications, such as a query handling manager 1120, an I/O controller 1110, a database controller 1115, at least one memory 1125, at least one processor 1130, and a database 1135. These components may be in electronic communication or otherwise coupled (e.g., operatively, communicatively, functionally, electronically, electrically) via one or more buses (e.g., a bus 1140).

The I/O controller 1110 may manage input signals 1145 and output signals 1150 for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. In other cases, the I/O controller 1110 may represent or interact with a modem, a keyboard, a mouse, a touchscreen, or a similar device. In some cases, the I/O controller 1110 may be implemented as part of a processor 1130. In some examples, a user may interact with the device 1105 via the I/O controller 1110 or via hardware components controlled by the I/O controller 1110.

The database controller 1115 may manage data storage and processing in a database 1135. In some cases, a user may interact with the database controller 1115. In other cases, the database controller 1115 may operate automatically without user interaction. The database 1135 may be an example of a single database, a distributed database, multiple distributed databases, a data store, a data lake, or an emergency backup database.

Memory 1125 may include random-access memory (RAM) and read-only memory (ROM). The memory 1125 may store computer-readable, computer-executable software including instructions that, when executed, cause at least one processor 1130 to perform various functions described herein. In some cases, the memory 1125 may contain, among other things, a basic I/O system (BIOS) which may control basic hardware or software operation such as the interaction with peripheral components or devices. The memory 1125 may be an example of a single memory or multiple memories. For example, the device 1105 may include one or more memories 1125.

The processor 1130 may include an intelligent hardware device (e.g., a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some cases, the processor 1130 may be configured to operate a memory array using a memory controller. In other cases, a memory controller may be integrated into the processor 1130. The processor 1130 may be configured to execute computer-readable instructions stored in at least one memory 1125 to perform various functions (e.g., functions or tasks supporting techniques for using generative AI to formulate search answers). The processor 1130 may be an example of a single processor or multiple processors. For example, the device 1105 may include one or more processors 1130.

For example, the query handling manager 1120 may be configured as or otherwise support a means for obtaining, by an orchestration and compute service of a data processing system, a set of articles including query answers and instructional content for users of the data processing system. The query handling manager 1120 may be configured as or otherwise support a means for dynamically partitioning the set of articles into a collection of passages that contain excerpts of the query answers and instructional content extracted from the set of articles. The query handling manager 1120 may be configured as or otherwise support a means for generating a set of vector-based objects and a set of token-based objects that represent the collection of passages containing the excerpts of data from the set of articles. The query handling manager 1120 may be configured as or otherwise support a means for storing, in a first database of the data processing system, the collection of passages and first metadata associated with the collection of passages. The query handling manager 1120 may be configured as or otherwise support a means for storing, in a second database of the data processing system, a first search index associated with the set of vector-based objects, a second search index associated with the set of token-based objects, and second metadata associated with the collection of passages. The query handling manager 1120 may be configured as or otherwise support a means for retrieving one or more passages from the first database in association with using the first search index and the second search index to identify a correlation between the one or more passages and a plain-text query received from a user of the data processing system.

For example, the query handling manager 1120 may be configured as or otherwise support a means for converting, by a prediction and execution service of a data processing system, a plain-text query into a vector-based object based on using a text embedding function to process one or more tokens in the plain-text query. The query handling manager 1120 may be configured as or otherwise support a means for retrieving a set of passages from a first datastore of the data processing system based on using one or more search indexes stored in a second datastore of the data processing system to compare the vector-based object and the one or more tokens in the plain-text query to vector-based objects and token-based objects associated with the set of passages. The query handling manager 1120 may be configured as or otherwise support a means for generating a prompt that includes tokens from the plain-text query, tokens from one or more of the set of passages retrieved from the first datastore, and instructions for creating a response to the plain-text query. The query handling manager 1120 may be configured as or otherwise support a means for transmitting the prompt via an API gateway between the prediction and execution service of the data processing system and an LLM. The query handling manager 1120 may be configured as or otherwise support a means for performing a data validation process to verify the response provided by the LLM before returning the response to a user associated with the plain-text query.

Figure 12:
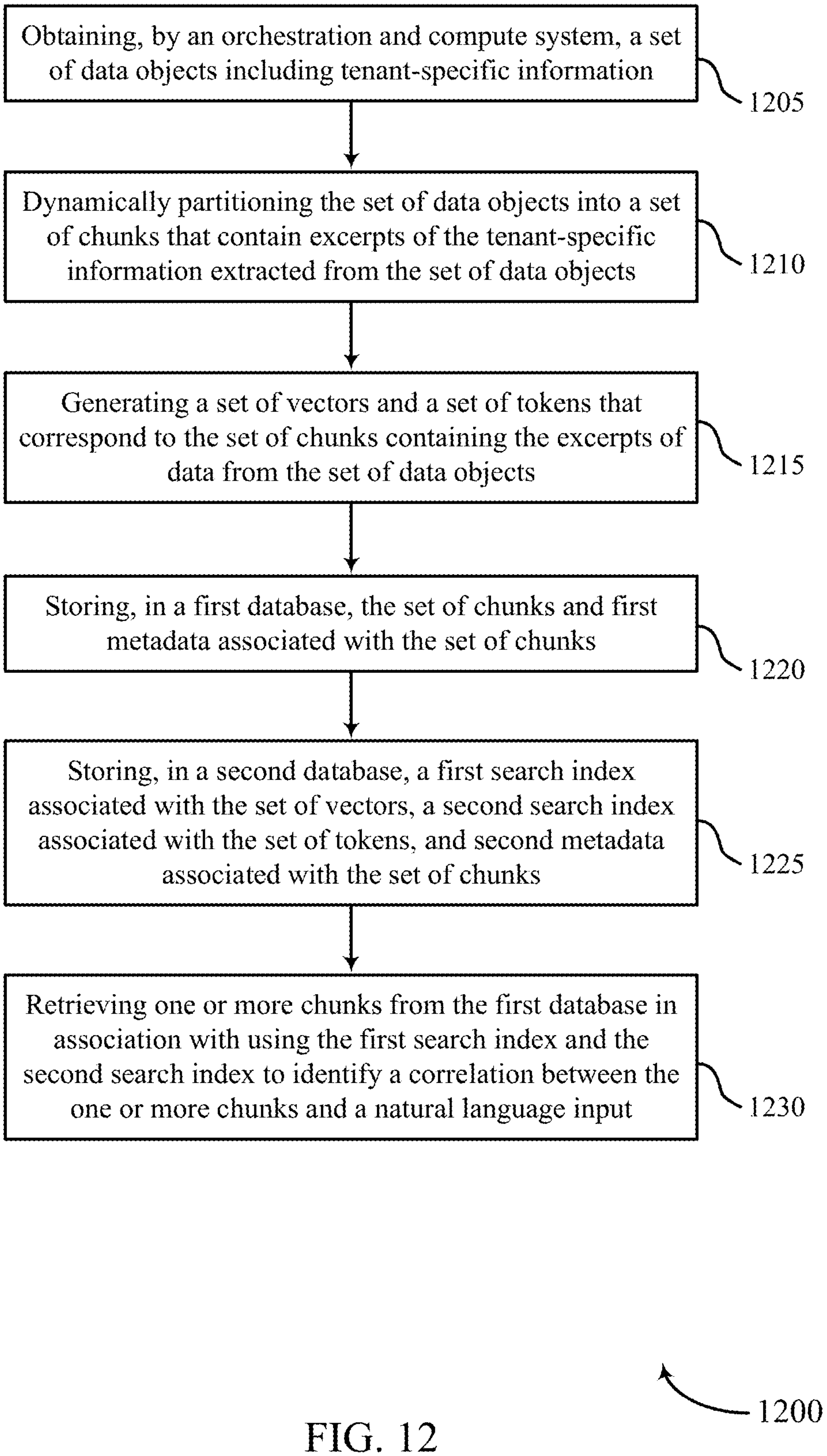
FIGS. 12 and 13 show flowcharts illustrating methods that support techniques for using generative AI to formulate search answers in accordance with aspects of the present disclosure.

FIG. 12 shows a flowchart illustrating a method 1200 that supports techniques for using generative AI to formulate search answers in accordance with aspects of the present disclosure. The operations of the method 1200 may be implemented by a data processing system or components thereof. For example, the operations of the method 1200 may be performed by the data processing system 200, as described with reference to FIG. 2. In some examples, the data processing system may execute a set of instructions to control the functional elements of the data processing system to perform the described functions. Additionally, or alternatively, the data processing system may perform aspects of the described functions using special-purpose hardware.

At 1205, the method includes obtaining, by an orchestration and compute system, a set of data objects including tenant-specific information. In some examples, aspects of the operations of 1205 may be performed by an article processing component 1025, as described with reference to FIG. 10.

At 1210, the method includes partitioning the set of data objects into a set of chunks that contain excerpts of the tenant-specific information extracted from the set of data objects. In some examples, aspects of the operations of 1210 may be performed by an article processing component 1025, as described with reference to FIG. 10.

At 1215, the method includes generating a set of vectors and a set of tokens that correspond to the set of chunks containing the excerpts of data from the set of data objects. In some examples, aspects of the operations of 1215 may be performed by an object generating component 1030, as described with reference to FIG. 10.

At 1220, the method includes storing, in a first database, the set of chunks and first metadata associated with the set of chunks. In some examples, aspects of the operations of 1220 may be performed by a passage storing component 1035, as described with reference to FIG. 10.

At 1225, the method includes storing, in a second database, a first search index associated with the set of vectors, a second search index associated with the set of tokens, and second metadata associated with the set of chunks. In some examples, aspects of the operations of 1225 may be performed by a search indexing component 1040, as described with reference to FIG. 10.

At 1230, the method includes retrieving one or more chunks from the first database in association with using the first search index and the second search index to identify a correlation between the one or more chunks and a natural language input. In some examples, aspects of the operations of 1230 may be performed by a search indexing component 1040, as described with reference to FIG. 10.

Figure 13:
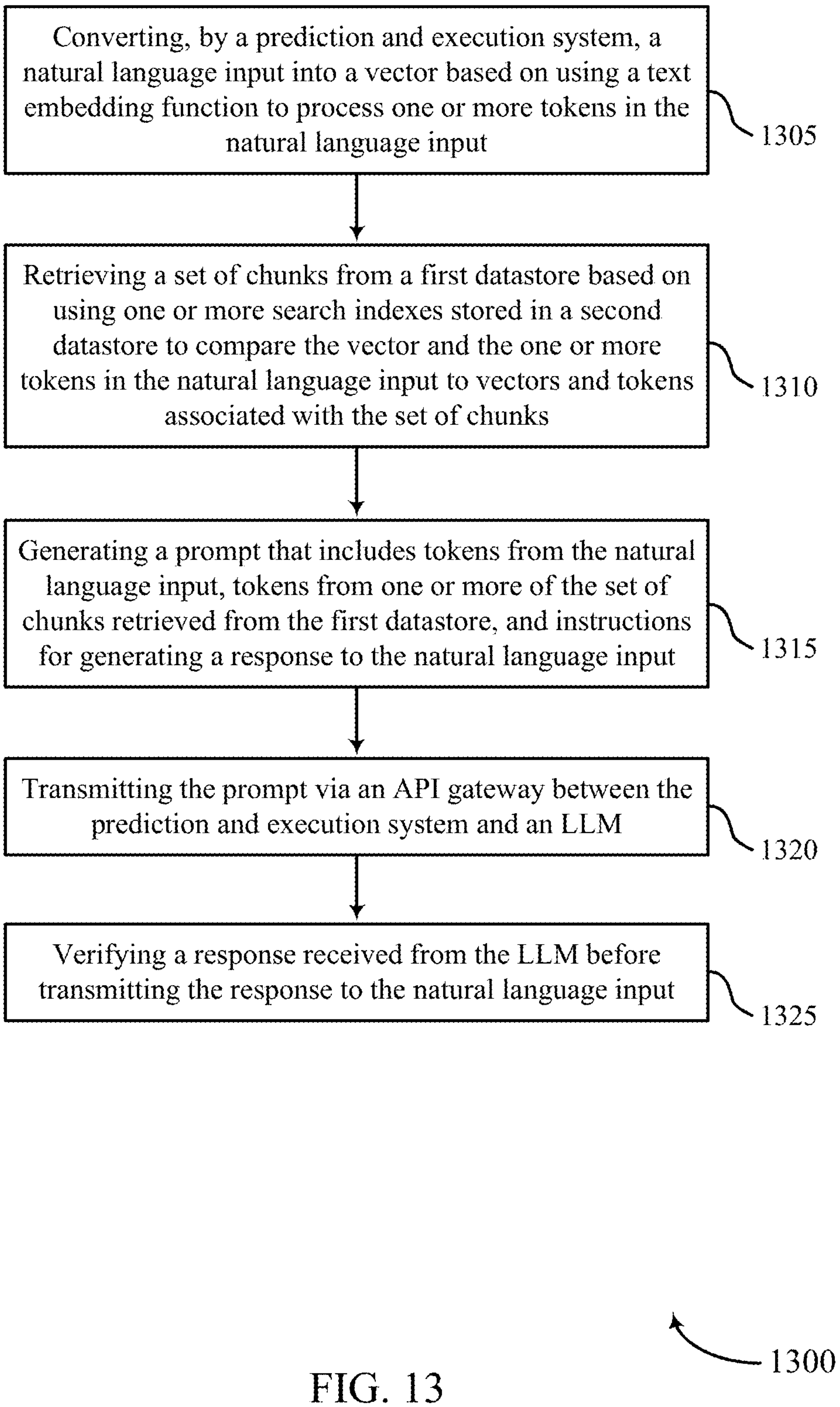

FIG. 13 shows a flowchart illustrating a method 1300 that supports techniques for using generative AI to formulate search answers in accordance with aspects of the present disclosure. The operations of the method 1300 may be implemented by a data processing system or components thereof. For example, the operations of the method 1300 may be performed by the data processing system 600, as described with reference to FIG. 6. In some examples, the data processing system may execute a set of instructions to control the functional elements of the data processing system to perform the described functions. Additionally, or alternatively, the data processing system may perform aspects of the described functions using special-purpose hardware.

At 1305, the method includes converting, by a prediction and execution system, a natural language input into a vector based on using a text embedding function to process one or more tokens in the natural language input. In some examples, aspects of the operations of 1305 may be performed by a query processing component 1050, as described with reference to FIG. 10.

At 1310, the method includes retrieving a set of chunks from a first datastore based on using one or more search indexes stored in a second datastore to compare the vector and the one or more tokens in the natural language input to vectors and tokens associated with the set of chunks. In some examples, aspects of the operations of 1310 may be performed by a search indexing component 1040, as described with reference to FIG. 10.

At 1315, the method includes generating a prompt that includes tokens from the natural language input, tokens from one or more of the set of chunks retrieved from the first datastore, and instructions for generating a response to the natural language input. In some examples, aspects of the operations of 1315 may be performed by an LLM prompting component 1045, as described with reference to FIG. 10.

At 1320, the method includes transmitting the prompt via an API gateway between the prediction and execution service and an LLM. In some examples, aspects of the operations of 1320 may be performed by an LLM prompting component 1045. as described with reference to FIG. 10.

At 1325, the method includes verifying a response received from the LLM before transmitting the response to the natural language input. In some examples, aspects of the operations of 1325 may be performed by a data validating component 1060, as described with reference to FIG. 10.

A method is described. The method includes: obtaining, by an orchestration and compute system, a set of data objects including tenant-specific information; dynamically partitioning the set of data objects into a set of chunks that contain excerpts of the tenant-specific information extracted from the set of data objects; generating a set of vectors and a set of tokens that correspond to the set of chunks containing the excerpts of data from the set of data objects; storing, in a first database, the set of chunks and first metadata associated with the set of chunks; storing, in a second database, a first search index associated with the set of vectors, a second search index associated with the set of tokens, and second metadata associated with the set of chunks; and retrieving one or more chunks from the first database in association with using the first search index and the second search index to identify a correlation between the one or more chunks and a natural language input.

An apparatus is described. The apparatus includes at least one memory storing code, and one or more processors coupled with the at least one memory. The one or more processors are individually or collectively operable to execute the code to cause the apparatus to: obtain, by an orchestration and compute system, a set of data objects including tenant-specific information, dynamically partition the set of data objects into a set of chunks that contain excerpts of the tenant-specific information extracted from the set of data objects; generate a set of vectors and a set of tokens that correspond to the set of chunks containing the excerpts of data from the set of data objects; store, in a first database, the set of chunks and first metadata associated with the set of chunks; store, in a second database, a first search index associated with the set of vectors, a second search index associated with the set of tokens, and second metadata associated with the set of chunks; and retrieve one or more chunks from the first database in association with using the first search index and the second search index to identify a correlation between the one or more chunks and a natural language input.

In some examples described herein, the first metadata stored in the first database includes one or more passage identifiers, record identifiers, field names, text, or HTML information associated with the set of chunks.

Some examples described herein may further include operations, features, means, or instructions for generating and storing one or more execution graph parameters associated with the first search index and the second search index in a datastore.

In some examples described herein, dynamically partitioning the set of data objects may include operations, features, means, or instructions for splitting a corpus of text into at least two passages based on a set of HTML tags present in source code of an article containing the corpus of text.

Some examples described herein may further include operations, features, means, or instructions for converting, by a prediction and execution service, the natural language input into a vector-based object based on using a text embedding function to process one or more tokens in the natural language input.

Some examples described herein may further include operations, features, means, or instructions for ranking the set of chunks retrieved from the first database by computing a set of vector-based relevancy metrics and a set of token-based relevancy metrics for the set of chunks.

A method is described. The method includes: converting, by a prediction and execution system, a natural language input into a vector based on using a text embedding function to process one or more tokens in the natural language input; retrieving a set of chunks from a first datastore based on using one or more search indexes stored in a second datastore to compare the vector and the one or more tokens in the natural language input to vectors and tokens associated with the set of chunks; generating a prompt that includes tokens from the natural language input, tokens from one or more of the set of chunks retrieved from the first datastore, and instructions for generating a response to the natural language input; transmitting the prompt via an API gateway between the prediction and execution system and an LLM; and verifying a response received from the LLM before transmitting the response to the natural language input.

Some examples described herein may further include operations, features, means, or instructions for ranking the set of chunks retrieved from the first datastore by computing a set of vector-based relevancy metrics and a set of token-based relevancy metrics for the set of chunks.

In some examples described herein, ranking the set of chunks may include operations, features, means, or instructions for combining a first set of passage identifiers retrieved from a first search index of vector-based objects and a second set of passage identifiers retrieved from a second search index of token-based objects into a single ranked list of passages to use for prompt generation.

In some examples described herein, ranking the set of chunks may include operations, features, means, or instructions for removing one or more passages with vector-based relevancy metrics or token-based relevancy metrics below a threshold.

Some examples described herein may further include operations, features, means, or instructions for performing a user field access check to verify that a user may be authorized to view or access the set of chunks before generating the prompt.

In some examples described herein, generating the prompt may include operations, features, means, or instructions for masking one or more words or tokens in the natural language input that include PII or other sensitive data.

In some examples described herein, the response provided by the LLM contains text extracted from one or more passages and links to the one or more passages provided by the prediction and execution system.

In some examples described herein, verifying the response may include operations, features, means, or instructions for performing a comparison between tokens in the response provided by the LLM, tokens in the natural language input, and tokens in the set of chunks retrieved from the first datastore.

In some examples described herein, verifying the response may include operations, features, means, or instructions for verifying that a format of the response and any citations therein conform to the instructions provided by the prediction and execution system.

In some examples described herein, verifying the response may include operations, features, means, or instructions for analyzing data in the response provided by the LLM for toxicity and bias mitigation, feedback analysis, and content moderation.

In some examples described herein, transmitting the prompt to the LLM may include operations, features, means, or instructions for establishing a secure communication channel between the prediction and execution system and a provider of the LLM, where the prompt and the response may be communicated via the secure communication channel.

In some examples described herein, the LLM may be configured to delete all data provided by the prediction and execution system after returning the response.

Some examples described herein may further include operations, features, means, or instructions for retaining the prompt and the response in a cache for a tenant-configured retention period and using one or both of the prompt or the response to process subsequent queries from other users.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method of data processing, comprising:

converting, by a prediction and execution system, a natural language input into a vector based at least in part on using a text embedding function to process one or more tokens in the natural language input;

retrieving a plurality of chunks from a first datastore based at least in part on using one or more search indexes stored in a second datastore to compare the vector and the one or more tokens in the natural language input to vectors and tokens associated with the plurality of chunks;

combining a first set of passage identifiers retrieved from a first search index of vector-based objects and a second set of passage identifiers retrieved from a second search index of token-based objects into one or more ranked lists of passages to use for prompt generation;

generating a prompt that includes at least one token of the one or more tokens in the natural language input, one or more tokens from one or more chunks of the plurality of chunks retrieved from the first datastore, and instructions for generating a response to the natural language input, wherein the prompt is generated based at least in part on combining the first set of passage identifiers retrieved from the first search index and the second set of passage identifiers retrieved from the second search index;

transmitting the prompt via an application programming interface (API) gateway between the prediction and execution system and a large language model (LLM); and verifying a response received from the LLM before transmitting the response to the natural language input.

2. The method of claim 1, further comprising:

ranking the plurality of chunks retrieved from the first datastore by computing a set of vector-based relevancy metrics and a set of token-based relevancy metrics for the plurality of chunks.

3. The method of claim 2, wherein ranking the plurality of chunks comprises:

removing one or more passages with vector-based relevancy metrics or token-based relevancy metrics below a threshold.

4. The method of claim 1, further comprising:

performing a user field access check to verify that a user is authorized to view or access the plurality of chunks before generating the prompt.

5. The method of claim 1, wherein generating the prompt comprises:

masking one or more words or tokens in the natural language input that include personally identifying information (PII) or other sensitive data.

6. The method of claim 1, wherein the response provided by the LLM contains text extracted from one or more passages and links to the one or more passages provided by the prediction and execution system.

7. The method of claim 1, wherein verifying the response comprises:

performing a comparison between tokens in the response provided by the LLM, the one or more tokens in the natural language input, and the tokens in the plurality of chunks retrieved from the first datastore.

8. The method of claim 1, wherein verifying the response comprises:

verifying that a format of the response and any citations therein conform to the instructions provided by the prediction and execution system, wherein the LLM is configured to delete all data provided by the prediction and execution system after returning the response.

9. The method of claim 1, wherein verifying the response comprises:

analyzing data in the response provided by the LLM for toxicity and bias mitigation, feedback analysis, and content moderation.

10. The method of claim 1, wherein transmitting the prompt to the LLM comprises:

establishing a secure communication channel between the prediction and execution system and a provider of the LLM, wherein the prompt and the response are communicated via the secure communication channel.

11. The method of claim 1, further comprising:

retaining the prompt and the response in a cache for a tenant-configured retention period; and using one or both of the prompt or the response to process subsequent queries from other users.

12. An apparatus, comprising:

at least one memory, wherein the at least one memory stores computer-executable code; and one or more processors coupled with the at least one memory and individually or collectively operable to execute the code to cause the apparatus to:

convert, by a prediction and execution system, a natural language input into a vector based at least in part on using a text embedding function to process one or more tokens in the natural language input;

retrieve a plurality of chunks from a first datastore based at least in part on using one or more search indexes stored in a second datastore to compare the vector and the one or more tokens in the natural language input to vectors and tokens associated with the plurality of chunks;

combine a first set of passage identifiers retrieved from a first search index of vector-based objects and a second set of passage identifiers retrieved from a second search index of token-based objects into one or more ranked lists of passages to use for prompt generation;

generate a prompt that includes at least one token of the one or more in the natural language input, one or more tokens from one or more chunks of the plurality of chunks retrieved from the first datastore, and instructions for generating a response to the natural language input, wherein the prompt is generated based at least in part on combining the first set of passage identifiers retrieved from the first search index and the second set of passage identifiers retrieved from the second search index;

transmit the prompt via an application programming interface (API) gateway between the prediction and execution system and a large language model (LLM); and verify a response received from the LLM before transmitting the response to the natural language input.

13. The apparatus of claim 12, wherein the one or more processors are further operable to execute the code to cause the apparatus to:

rank the plurality of chunks retrieved from the first datastore by computing a set of vector-based relevancy metrics and a set of token-based relevancy metrics for the plurality of chunks.

14. The apparatus of claim 13, wherein, to rank the plurality of chunks, the one or more processors are further operable to cause the apparatus to:

remove one or more passages with vector-based relevancy metrics or token-based relevancy metrics below a threshold.

15. The apparatus of claim 12, wherein the one or more processors are further operable to cause the apparatus to:

perform a user field access check to verify that a user is authorized to view or access the plurality of chunks before generating the prompt.

16. The apparatus of claim 12, wherein the one or more processors are further operable to cause the apparatus to:

mask one or more words or tokens in the natural language input that include personally identifying information (PII) or other sensitive data.

17. The apparatus of claim 12, wherein, to verify the response, the one or more processors are operable to cause the apparatus to:

perform a comparison between tokens in the response provided by the LLM, the one or more tokens in the natural language input, and the tokens in the plurality of chunks retrieved from the first datastore.

18. A non-transitory computer-readable medium storing one or more programs, the one or more programs comprising instructions executable by one or more processors to:

convert, by a prediction and execution system, a natural language input into a vector based at least in part on using a text embedding function to process one or more tokens in the natural language input;

retrieve a plurality of chunks from a first datastore based at least in part on using one or more search indexes stored in a second datastore to compare the vector and the one or more tokens in the natural language input to vectors and tokens associated with the plurality of chunks;

combine a first set of passage identifiers retrieved from a first search index of vector-based objects and a second set of passage identifiers retrieved from a second search index of token-based objects into one or more ranked lists of passages to use for prompt generation;

generate a prompt that includes at least one token of the one or more in the natural language input, one or more tokens from one or more chunks of the plurality of chunks retrieved from the first datastore, and instructions for generating a response to the natural language input, wherein the prompt is generated based at least in part on combining the first set of passage identifiers retrieved from the first search index and the second set of passage identifiers retrieved from the second search index;

transmit the prompt via an application programming interface (API) gateway between the prediction and execution system and a large language model (LLM); and verify a response received from the LLM before transmitting the response to the natural language input.

* * * * *